United States Patent
Inamura et al.

(10) Patent No.: US 11,007,872 B2
(45) Date of Patent: May 18, 2021

(54) SHIFT DEVICE

(71) Applicant: KABUSHIKI KAISHA TOKAI-RIKA-DENKI-SEISAKUSHO, Aichi (JP)

(72) Inventors: Yutaka Inamura, Aichi (JP); Naomi Asahina, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 145 days.

(21) Appl. No.: 16/490,176

(22) PCT Filed: Feb. 23, 2018

(86) PCT No.: PCT/JP2018/006811
§ 371 (c)(1),
(2) Date: Aug. 30, 2019

(87) PCT Pub. No.: WO2018/168408
PCT Pub. Date: Sep. 20, 2018

(65) Prior Publication Data
US 2020/0001709 A1 Jan. 2, 2020

(30) Foreign Application Priority Data
Mar. 14, 2017 (JP) .............................. JP2017-048412

(51) Int. Cl.
F16H 59/10 (2006.01)
F16H 61/24 (2006.01)
B60K 20/02 (2006.01)

(52) U.S. Cl.
CPC ............. B60K 20/02 (2013.01); F16H 59/10 (2013.01); F16H 59/105 (2013.01); F16H 2061/242 (2013.01)

(58) Field of Classification Search
CPC ............. F16H 2059/0269; F16H 59/10; F16H 2061/242; F16H 59/0204; F16H 59/105; F16H 2061/223; B60K 20/02
See application file for complete search history.

(56) References Cited

U.S. PATENT DOCUMENTS 5,263,383 A * 11/1993 Meisch .................. F16H 59/10
403/326
5,829,308 A * 11/1998 Kanamori ............... F16H 59/10
74/473.3

(Continued)

FOREIGN PATENT DOCUMENTS

JP 2004-255969 A 9/2004

OTHER PUBLICATIONS

International Search Report issued in a corresponding application PCT/JP2018/006811 dated May 22, 2018.

Primary Examiner — William Kelleher
Assistant Examiner — Gregory T Prather
(74) Attorney, Agent, or Firm — Roberts Calderon Safran & Cole P.C.

(57) ABSTRACT

Rattling of a shift body in a second direction is suppressed when movement of the shift body toward one side in the second direction is restricted. In a shift lever device, a projecting portion of a hook of a lever projects toward the left from the lever. When disposing the lever on an R position side from an N position, a leading end face of the projecting portion is restricted from pivoting toward the left side by a right face of a rear restricting portion of a left plate, such that a pivot operation of the lever toward the right side is restricted. Flexing of the hook can thereby be suppressed, enabling rattling of the lever in a left-right direction to be suppressed.

7 Claims, 28 Drawing Sheets

(56) References Cited

U.S. PATENT DOCUMENTS

| | | | | |
|---|---|---|---|---|
| 5,845,535 A * | 12/1998 | Wakabayashi | F16H 59/0204 | 74/473.18 |
| 5,899,115 A * | 5/1999 | Kataumi | F16H 59/0204 | 74/473.18 |
| 6,175,797 B1 * | 1/2001 | Iizuka | F16H 61/16 | 180/170 |
| 6,196,080 B1 * | 3/2001 | Lee | F16H 59/0204 | 74/473.18 |
| 6,230,579 B1 * | 5/2001 | Reasoner | F16H 59/0204 | 74/473.18 |
| 6,301,994 B1 * | 10/2001 | Syamoto | F16H 59/10 | 74/473.3 |
| 6,325,196 B1 * | 12/2001 | Beattie | F16H 59/0204 | 192/220.4 |
| 6,339,968 B1 * | 1/2002 | Nagashima | F16H 59/10 | 192/220.3 |
| 9,243,707 B2 * | 1/2016 | Yamamoto | F16H 59/0278 | |
| 2001/0004851 A1 * | 6/2001 | Kim | F16H 61/22 | 74/473.15 |
| 2003/0085098 A1 * | 5/2003 | Inoue | F16H 59/10 | 192/220.4 |
| 2003/0097897 A1 * | 5/2003 | Yamada | F16H 59/0204 | 74/473.21 |
| 2004/0162185 A1 * | 8/2004 | Giefer | F16H 59/0204 | 477/101 |
| 2004/0182191 A1 * | 9/2004 | Kondo | F16H 59/0278 | 74/473.3 |
| 2006/0005656 A1 * | 1/2006 | Inoguchi | F16H 59/10 | 74/473.23 |
| 2006/0272441 A1 * | 12/2006 | Kamei | F16H 59/10 | 74/473.21 |
| 2007/0137357 A1 * | 6/2007 | Tomida | F16H 59/10 | 74/473.1 |
| 2008/0034913 A1 * | 2/2008 | Takikawa | F16H 59/0278 | 74/473.33 |
| 2008/0098844 A1 * | 5/2008 | Kato | F16H 59/0204 | 74/473.18 |
| 2010/0101353 A1 * | 4/2010 | Giefer | F16H 63/3491 | 74/473.18 |
| 2012/0085193 A1 * | 4/2012 | Heo | F16H 59/0204 | 74/473.18 |
| 2014/0137684 A1 * | 5/2014 | Ujimoto | F16H 61/18 | 74/473.23 |
| 2014/0165764 A1 * | 6/2014 | Moon | F16H 59/10 | 74/473.21 |
| 2015/0000446 A1 * | 1/2015 | Yamamoto | F16H 59/10 | 74/473.3 |
| 2016/0341305 A1 * | 11/2016 | Kato | F16H 59/10 | |
| 2016/0348784 A1 * | 12/2016 | Kato | B60K 20/02 | |
| 2017/0219095 A1 * | 8/2017 | Beattie | F16H 61/22 | |
| 2017/0276237 A1 * | 9/2017 | Luvison | G05G 1/06 | |
| 2017/0292603 A1 * | 10/2017 | Min | F16H 61/36 | |
| 2017/0299049 A1 * | 10/2017 | Henion | F16H 59/10 | |
| 2018/0112772 A1 * | 4/2018 | Maitre | F16H 59/04 | |
| 2018/0372212 A1 * | 12/2018 | Peschke | F16H 59/0217 | |
| 2019/0072177 A1 * | 3/2019 | Tokumo | F16H 59/12 | |
| 2019/0186625 A1 * | 6/2019 | Contessa | F16H 59/0204 | |
| 2020/0072346 A1 * | 3/2020 | Matsumoto | F16H 59/10 | |
| 2020/0149627 A1 * | 5/2020 | Asahina | G05G 1/04 | |
| 2020/0208725 A1 * | 7/2020 | Kim | F16H 59/0204 | |

* cited by examiner

SHIFT DEVICE

CROSS-REFERENCE TO RELATED APPLICATIONS

The present application is a U.S. National Phase of PCT/JP2018/006811 filed on Feb. 23, 2018, claiming priority under 35 USC 119 from Japanese Patent Application No. 2017-048412 filed Mar. 14, 2017, the disclosure of which is incorporated by reference herein.

TECHNICAL FIELD

A preferable embodiment relates to a shift device in which a shift body is moved in a first direction and a second direction to change a shift position of the shift body.

BACKGROUND ART

In a shift lever device disclosed in Japanese Patent Application Laid-Open (JP-A) No. 2004-255969, a base end side portion of an engagement tab projects from shift lever in a select direction, and a leading end side portion of the engagement tab projects from the base end side portion of the engagement tab.

In this shift lever device, an engagement protrusion restricts movement of the leading end side portion of the engagement tab such that movement of a shift lever toward both sides in the select direction is restricted.

SUMMARY OF INVENTION

Technical Problem

In consideration of the above circumstances, an object of the present disclosure is to obtain a shift device capable of suppressing rattling of a shift body in a second direction when movement of the shift body toward one side in the second direction is restricted.

Solution to Problem

A shift device of a first aspect of the present disclosure includes a shift body, a first projecting portion, a second projecting portion, and a restricting body. The shift body is moved from a home position in a first direction and in a second direction intersecting the first direction so as to change a shift position, the first direction being forward or rearward of the shift body and the second direction being a left-right direction of the shift body, and the shift body extends in an extension direction intersecting the first direction and the second direction. The first projecting portion projects from the shift body toward a first side in the second direction. The second projecting portion projects from the first projecting portion toward a first side in the extension direction of the shift body. The restricting body restricts movement of a projection leading end face of the first projecting portion such that operation of the shift body toward a second side in the second direction is restricted, and restricts movement of the second projecting portion such that movement of the shift body is restricted.

A shift device of a second aspect of the present disclosure is the shift device of the first aspect, wherein the first projecting portion projects in a substantially perpendicular direction to a length direction of the shift body, and the projection leading end face of the first projecting portion is disposed along the length direction of the shift body.

A shift device of a third aspect of the present disclosure is the shift device of the first aspect or the second aspect, wherein the restricting body restricts movement of the shift body such that movement of the shift body in the first direction is restricted.

A shift device of a fourth aspect of the present disclosure is the shift device of any one of the first aspect to the third aspect, further including a slide face that is provided at at least one of the first projecting portion or the second projecting portion, the slide face slides in the first direction with respect to the restricting body, and the slide face has a curved shape.

A shift device of a fifth aspect of the present disclosure is the shift device of any one of the first aspect to the fourth aspect, wherein the shift body is capable of pivoting, and the second projecting portion projects toward a pivot center side of the shift body.

A shift device of a sixth aspect of the present disclosure is the shift device of any one of the first aspect to the fifth aspect, wherein the restricting body is provided with a pair of restricting faces that restrict movement of the first projecting portion and the second projecting portion such that movement of the shift body in the first direction is restricted when the shift body is moved in the second direction from the home position. Moreover, beginning partway through movement of the shift body in the second direction from the home position, one of the pair of restricting faces restricts movement of only one of the first projecting portion or the second projecting portion such that movement of the shift body in the first direction is restricted.

A shift device of a seventh aspect of the present disclosure is the shift device of any one of the first aspect to the sixth aspect, wherein the restricting body restricts movement of the first projecting portion and the second projecting portion toward a projection direction side of the first projecting portion, and a detection mechanism configured to detect a shift position of the shift body is provided at an opposite side of the restricting body from the projection direction side of the first projecting portion.

Advantageous Effects of Invention

In the shift device of the first aspect of the present disclosure, the shift position of the shift body is changed by moving the shift body in the first direction and the second direction. The shift body extends in an extension direction intersecting the first direction and the second direction. The first projecting portion projects from the shift body toward the first side in the second direction, and the second projecting portion projects from the first projecting portion toward the first side in the extension direction of the shift body. The restricting body restricts movement of the second projecting portion such that movement of the shift body is restricted.

Note that the first projecting portion projects from the shift body toward the first side in the second direction, and the restricting body restricts movement of the projection leading end face of the first projecting portion such that operation of the shift body toward the second side in the second direction is restricted. This enables deformation of the first projecting portion to be suppressed when operation of the shift body toward the second side in the second direction is being restricted, enabling rattling of the shift body in the second direction to be suppressed.

In the shift device of the second aspect of the present disclosure, the first projecting portion projects toward the side in a direction perpendicular to the length direction of the shift body, and the projection leading end face of the first projecting portion is disposed along the length direction of the shift body. Thus, when operation of the shift body toward the second side in the second direction is restricted, compression stress can be made to effectively act on the first projecting portion, enabling deformation of the first projecting portion to be effectively suppressed, and thereby enabling rattling of the shift body in the second direction to be effectively suppressed.

In the shift device of the third aspect of the present disclosure, the restricting body restricts movement of the shift body such that movement of the shift body in the first direction is restricted. This enables the strength with which movement of the shift body in the first direction is restricted to be increased.

In the shift device of the fourth aspect of the present disclosure, at least one of the first projecting portion and the second projecting portion is provided with the slide face. The slide face slides against the restricting body.

Note that the slide face is curved. This enables resistance of the slide face to sliding with respect to the restricting body to be reduced.

In the shift device of the fifth aspect of the present disclosure, the shift body is capable of pivoting, and the second projecting portion projects toward the pivot center side of the shift body. This enables the size of the shift device in a pivot-radial direction of the shift body to be reduced.

In the shift device of the sixth aspect of the present disclosure, the pair of restricting faces restrict movement of the first projecting portion and the second projecting portion such that movement of the shift body in the first direction is restricted when the shift body is being moved in the second direction from the home position. This enables movement of the shift body in the first direction to be effectively restricted.

Moreover, beginning partway through movement of the shift body in the second direction from the home position, one of the pair of restricting faces restricts movement of only one of the first projecting portion or the second projecting portion so as to restrict movement of the shift body in the first direction. This enables a force restricting movement of the shift body in the first direction to be reduced.

In the shift device of the seventh aspect of the present disclosure, the detection mechanism detects the shift position of the shift body.

The restricting body restricts movement of the first projecting portion and the second projecting portion toward the projection direction side of the first projecting portion, and the detection mechanism is provided at the opposite side of the restricting body from the projection direction side of the first projecting portion. This enables a load from the restricting body restricting movement of the first projecting portion and the second projecting portion to be suppressed from acting toward the opposite side from the projection direction of the first projecting portion, enabling the detection accuracy of the shift position of the shift body by the detection mechanism to be improved.

DESCRIPTION OF EMBODIMENTS

First Exemplary Embodiment

Figure 1:
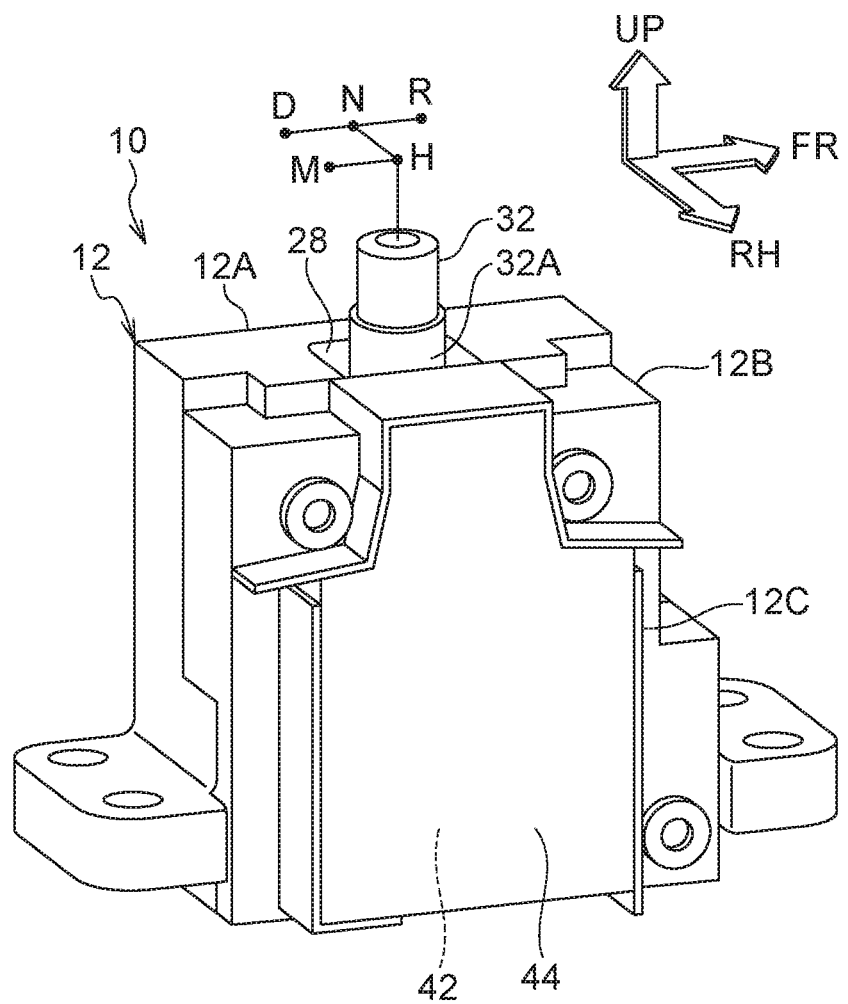
FIG. 1 is a perspective view illustrating a shift lever device according to a first exemplary embodiment of the present invention, as viewed obliquely from a rear-right side.

FIG. 1 is a perspective view illustrating a shift lever device 10, serving as a shift device according to a first exemplary embodiment of the present disclosure, as viewed obliquely from a rear right side. Note that in the drawings, an arrow FR indicates a front side of the shift lever device 10, an arrow RH indicates a right side of the shift lever device 10, and an arrow UP indicates an upper side of the shift lever device 10.

The shift lever device 10 according to the present exemplary embodiment is floor-mounted, and is installed at a vehicle width direction center portion of a floor section (vehicle body side) of a vehicle cabin (automobile). The front, left, and upper side of the shift lever device 10 respectively face the front, left, and upper side of the vehicle.

As illustrated in FIG. 1, the shift lever device 10 is provided with a substantially rectangular box shaped plate 12 (housing), serving as a restricting body (housing body) made of resin.

Figure 2A:
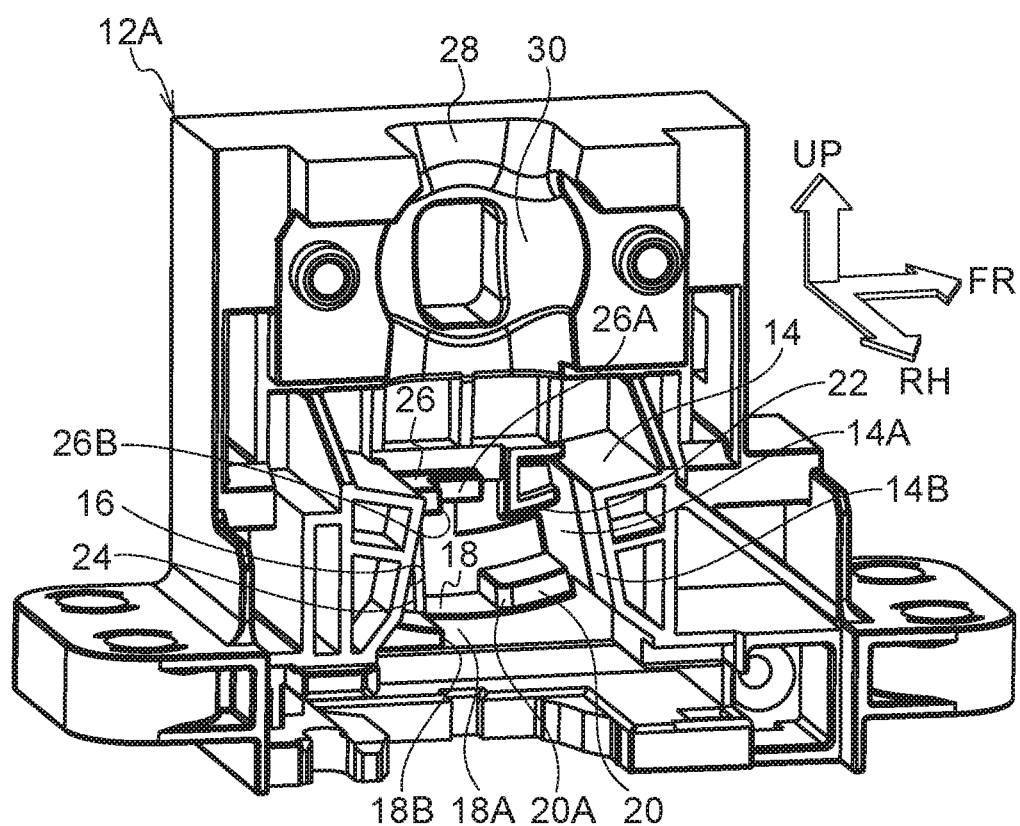
FIG. 2A is a perspective view illustrating a left plate of a shift lever device according to the first exemplary embodiment of the present invention, as viewed obliquely from the rear-right side.
Figure 2B:
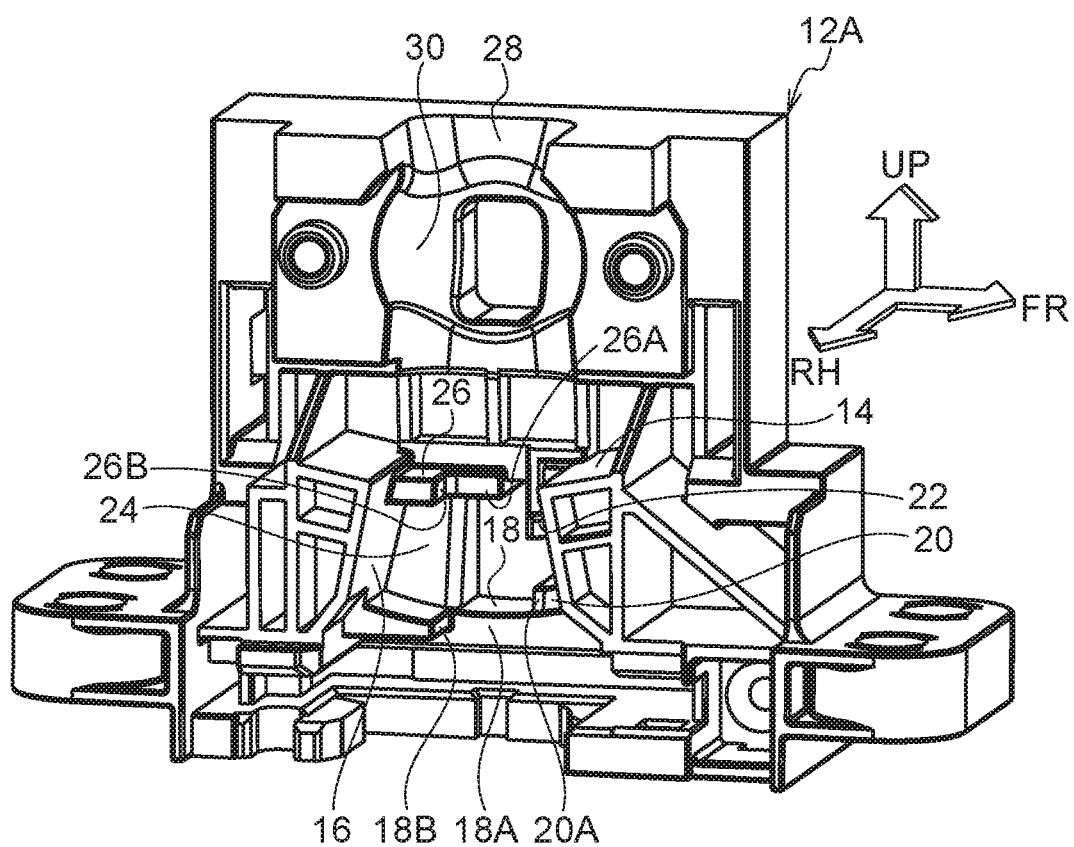
FIG. 2B is a perspective view illustrating a left plate of a shift lever device according to the first exemplary embodiment of the present invention, as viewed obliquely from a front-right side.

A substantially rectangular box shaped left plate 12A (see FIG. 2A and FIG. 2B), serving as a restricting member (a first housing member), is provided at a left side portion of the plate 12. The inside of the left plate 12A is open toward a right side. The left plate 12A is fastened (joined) to the floor section of the vehicle cabin, and the plate 12 is thereby installed to the floor section of the vehicle cabin.

A substantially trapezoidal column shaped front end restricting portion 14, configuring a first restricting portion, is formed at a front side portion inside the left plate 12A. The front end restricting portion 14 is integrally formed with a left wall of the left plate 12A, and projects toward the right from the left wall of the left plate 12A. A left side portion of a rear face of the front end restricting portion 14 configures a first front restricting face 14A. The first front restricting face 14A is a planar face that runs along a left-right direction, and slopes toward the front on progression downward. A right side portion of the rear face of the front end restricting portion 14 configures a second front restricting face 14B. The second front restricting face 14B is a planar face that slopes toward the front and right on progression downward.

A substantially trapezoidal column shaped rear end restricting portion 16, configuring a first restricting portion, is formed at a rear side portion inside the left plate 12A. The rear end restricting portion 16 is integrally formed with the left wall of the left plate 12A. The rear end restricting portion 16 projects toward the right from the left wall of the left plate 12A. A front face of the rear end restricting portion 16 is a planar face that slopes toward the rear and right on progression downward.

A lower end restricting portion 18 with an L-shaped plate shape in plan view is formed at a lower side of the front end restricting portion 14 and the rear end restricting portion 16, at a front-rear direction intermediate area inside the left plate 12A. The lower end restricting portion 18 is formed integrally with the left wall of the left plate 12A, the front end restricting portion 14, and the rear end restricting portion 16. The lower end restricting portion 18 projects toward the right from the left wall, and projects downward from the front end restricting portion 14 and the rear end restricting portion 16. An upper face of the lower end restricting portion 18 runs along the left-right direction, and curves in a concave shape about a left-right center axis line W, described below. A right face of a front side portion of the lower end restricting portion 18 configures a front restricting face 18A, configuring a second restricting portion. The front restricting face 18A has a planar face that is perpendicular to the left-right direction. A front face of a rear side portion of the lower end restricting portion 18 configures a central restricting face 18B, configuring a first restricting portion. The central restricting face 18B is a planar face that is perpendicular to the front-rear direction. A right face of the rear side portion of the lower end restricting portion 18 has a planar face that is perpendicular to the left-right direction.

A lower restricting portion 20 with a rectangular plate shape in plan view, configuring a first restricting portion and a second restricting portion, is formed at a rear side of the front end restricting portion 14 and an upper side of the lower end restricting portion 18, at a front-rear direction intermediate area of the left plate 12A. The lower restricting portion 20 is integrally formed with the left wall of the left plate 12A, and with the front end restricting portion 14 and the lower end restricting portion 18. The lower restricting portion 20 projects toward the right from the left wall, and projects toward a rear side from the front end restricting portion 14. An upper face of the lower restricting portion 20 curves in a concave shape about the left-right center axis line W, described below. A right face of the lower restricting portion 20 is a planar face running along the front-rear direction, and slopes downward on progression toward the right. A rear face (a restricting face) of the lower restricting portion 20 is a planar face perpendicular to the front-rear direction. A right and rear side corner portion 20A of the lower restricting portion 20 curves in a convex shape in plan view.

A substantially rectangular block shaped upper restricting portion 22, configuring a first restricting portion and a second restricting portion, is formed at a rear side of the front end restricting portion 14 and an upper side of the lower restricting portion 20, at the front-rear direction intermediate area inside the left plate 12A. The upper restricting portion 22 is integrally formed with the front end restricting portion 14, and is spaced apart from the left wall of the left plate 12A and from the lower restricting portion 20. The upper restricting portion 22 projects toward a rear side from the front end restricting portion 14. A rear face (a restricting face) of the upper restricting portion 22 is a planar face that is perpendicular to the front-rear direction and is in the same plane as the rear face of the lower restricting portion 20. A left face and a right face of the upper restricting portion 22 are planar faces that are perpendicular to the left-right direction. A lower face of the upper restricting portion 22 slopes downward on progression toward the right, and curves in a convex shape about the left-right center axis line W, described below. An upper portion of the upper restricting portion 22 is coupled to the left wall of the left plate 12A.

A substantially trapezoidal column shaped rear restricting portion 24, configuring a second restricting portion, is formed at a rear side of the lower restricting portion 20 and the upper restricting portion 22, at the front-rear direction intermediate area inside the left plate 12A. The rear restricting portion 24 is formed integrally with the left wall of the left plate 12A, the rear end restricting portion 16, and the lower end restricting portion 18. The rear restricting portion 24 projects toward a front side from the rear end restricting portion 16. A front face of the rear restricting portion 24 is a planar face perpendicular to the front-rear direction. A right face of the rear restricting portion 24 is a planar face running along the front-rear direction, and slopes toward the right on progression downward.

An upper end restricting portion 26 with a substantially L-shape plate shape in plan view is formed at an upper side of the rear restricting portion 24, at the front-rear direction intermediate area inside the left plate 12A. The upper end restricting portion 26 is formed integrally with the left wall of the left plate 12A, the rear end restricting portion 16, and the rear restricting portion 24. The upper end restricting portion 26 projects toward the right from the left wall, and projects toward a front from the rear end restricting portion 16. A right face of a front side portion of the upper end restricting portion 26 configures a left restricting face 26A, configuring a second restricting portion. The left restricting face 26A is a planar face perpendicular to the left-right direction. A front face of a rear side portion of the upper end restricting portion 26 configures a rear restricting face 26B, configuring a first restricting portion. The rear restricting face 26B is a planar face perpendicular to the front-rear direction.

An upper restricting face 28, configuring a second restricting portion, is formed at a right face of a front-rear direction central portion of an upper end portion of the left plate 12A. The upper restricting face 28 is a planar face running along the front-rear direction, and slopes toward the left on progression upward.

A substantially rectangular box shaped right plate 12B, serving as an installation member (a second housing member), is provided at a right side portion of the plate 12. The inside of the right plate 12B is open toward a left side. The right plate 12B is fastened (joined) to the left plate 12A, and the right plate 12B is fixed to the floor section of the vehicle cabin through the left plate 12A (is not directly fastened to the floor section of the vehicle cabin). A housing frame 12C with a cross-section profile substantially in an inverted U shaped is integrally provided at the right side of the right plate 12B. An inside of the housing frame 12C is open toward the right side.

A spherical face shaped shaft bearing face 30, serving as a support portion, is formed at an upper portion of the plate 12. The shaft bearing face 30 is formed divided at the left plate 12A and the right plate 12B. The interior of the shaft bearing face 30 is open toward an upper side and a lower side, and the upper restricting face 28 at the upper end portion of the left plate 12A configures a peripheral face of an upward-opening portion at the interior of the shaft bearing face 30.

Figure 3:
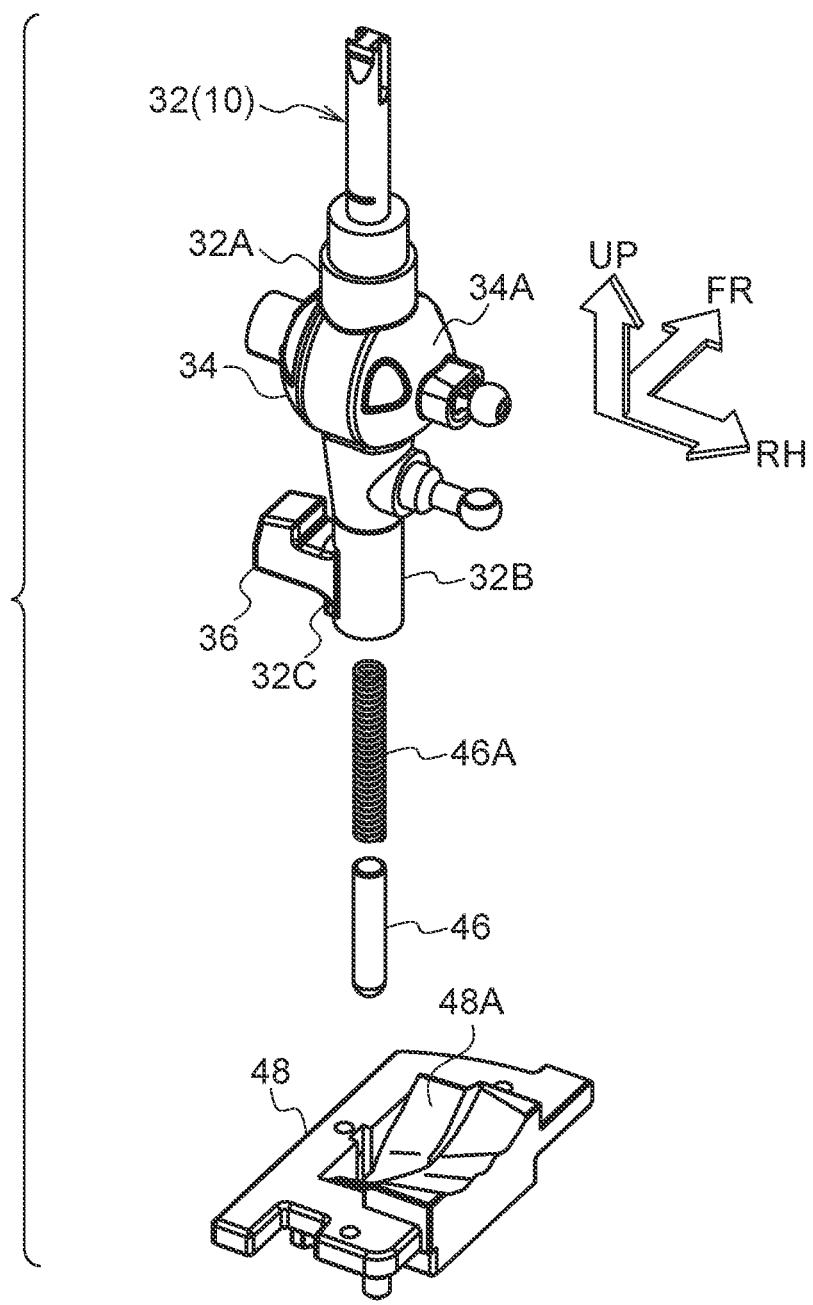
FIG. 3 is an exploded perspective view illustrating a lever and so on of a shift lever device according to the first exemplary embodiment of the present invention, as viewed obliquely from the rear-right side.
Figure 4A:
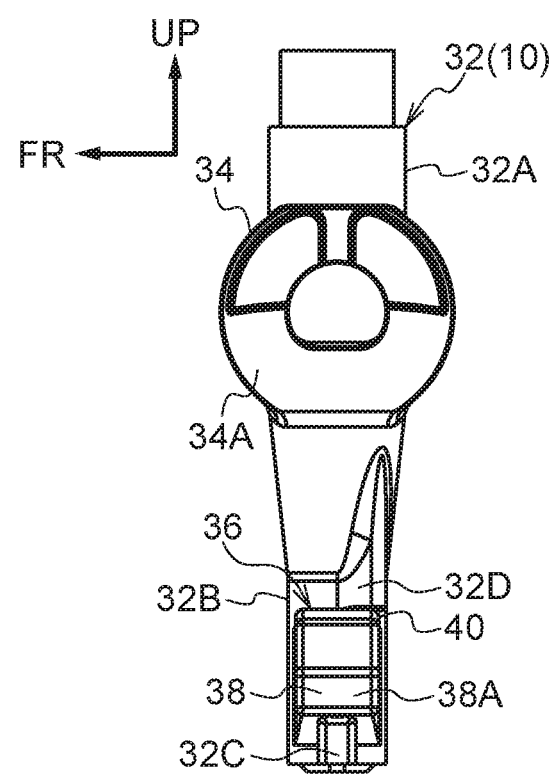
FIG. 4A is a left-hand view illustrating a lever of a shift lever device according to the first exemplary embodiment of the present invention, as viewed from a left side.
Figure 4B:
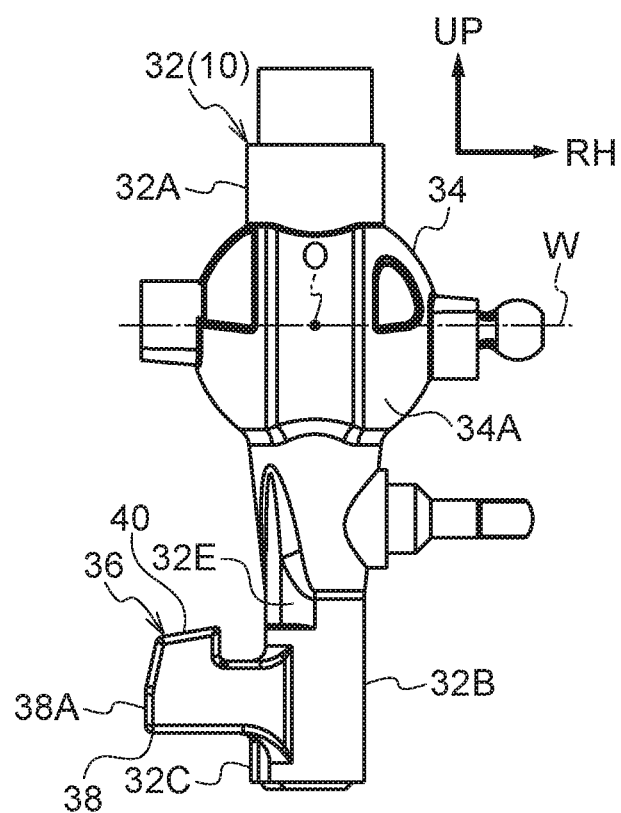
FIG. 4B is a rear view illustrating a lever of a shift lever device according to the first exemplary embodiment of the present invention, as viewed from a rear side.

A substantially circular column shaped lever 32 (see FIG. 3, FIG. 4A, and FIG. 4B), serving as a shift body made of resin, is inserted inside the plate 12. A substantially spherical ball shaft 34, serving as a supported portion, is provided at an up-down direction (length direction, axial direction) intermediate portion of the lever 32. A spherical face 34A is formed to an outer peripheral face of the ball shaft 34. The spherical face 34A of the ball shaft 34 fits together with the shaft bearing face 30 of the plate 12. The spherical face 34A of the lever 32 is supported by the shaft bearing face 30 so as to be capable of pivoting in the front-rear direction (a shift direction, a first direction) and the left-right direction (a select direction, a second direction), enabling pivoting of the lever 32 in the front-rear direction and the left-right direction about the ball shaft 34. A straight line that passes through a center O of the ball shaft 34 (spherical face 34A) and runs parallel to the left-right direction configures the left-right center axis line W.

An upper end portion of the lever 32 extends to an upper side of the plate 12. An occupant (such as the driver) of the vehicle is able to grip a non-illustrated knob at an upper end portion of the lever 32 in order to pivot-operate the lever 32. The lever 32 is disposed at an H position (a home position, corresponding to the "home position" of the claims), serving as a shift position (a predetermined shift position). The lever 32 is pivot-operated toward a rear side from the H position so as to be disposed at an M position (manual position) (or a B position (brake position)), serving as a shift position, and is pivot-operated toward a left side (or the right side) from the H position so as to be disposed at an N position (neutral position). The lever 32 is pivot-operated toward a front side from the N position so as to be disposed at an R position (reverse position), and is pivot-operated toward the rear side from the N position so as to be disposed at a D position (drive position).

An upper circumferential face 32A is formed directly above the ball shaft 34 at an upper portion of the lever 32. The upper circumferential face 32A curves coaxially to the lever 32. A lower circumferential face 32B is formed at a lower portion of the lever 32. The lower circumferential face 32B curves coaxially to the lever 32.

A bent column shaped hook 36, serving as a restricted portion, is formed at a left side of the lower portion (at the lower circumferential face 32B) of the lever 32. The hook 36 is integral with the lever 32, and a front face and a rear face of the hook 36 are planar faces that are perpendicular to the front-rear direction. A front-rear direction dimension of the hook 36 is set smaller than a front-rear direction dimension of the lower portion of the lever 32, such that the lower portion of the lever 32 projects further toward the front side and rear side than the hook 36.

A lever-lower side portion of the hook 36 configures a substantially rectangular column shaped projecting portion 38, serving as a first projecting portion. The projecting portion 38 projects toward the left from the lever 32, and an upper face and a lower face of the projecting portion 38 are planar faces that are perpendicular to the up-down direction. A lower side portion of a left face of the projecting portion 38 configures a leading end face 38A, serving as a projecting leading end face. The leading end face 38A is a planar face that is perpendicular to the left-right direction. An upper side portion of the left face of the projecting portion 38 is a planar face running along the front-rear direction, and slopes toward the right on progression upward.

A lever-upper side portion of the hook 36 configures a substantially rectangular column shaped hook portion 40, serving as a second projecting portion. The hook portion 40 projects upward from a left side portion of the projecting portion 38. A left face of the hook portion 40 is a planar face running along the front-rear direction that slopes toward the right on progression upward. The left face of the hook portion 40 is in the same plane as the upper side portion of the left face of the projecting portion 38. An upper face of the hook portion 40 is a planar face running along the front-rear direction that slopes upward on progression toward the right. A right face of the hook portion 40 is a planar face that is perpendicular to the left-right direction.

A substantially rectangular plate shaped projecting plate 32C is formed at a lower side of the hook 36 at a lower portion of the lever 32. The projecting plate 32C projects toward the left from the lower circumferential face 32B of the lever 32.

A left circumferential face 32D and a rear circumferential face 32E are formed at an upper side of the hook 36 at the lower portion of the lever 32. The left circumferential face 32D faces the left side, and the rear circumferential face 32E faces the rear side.

Figure 5A:
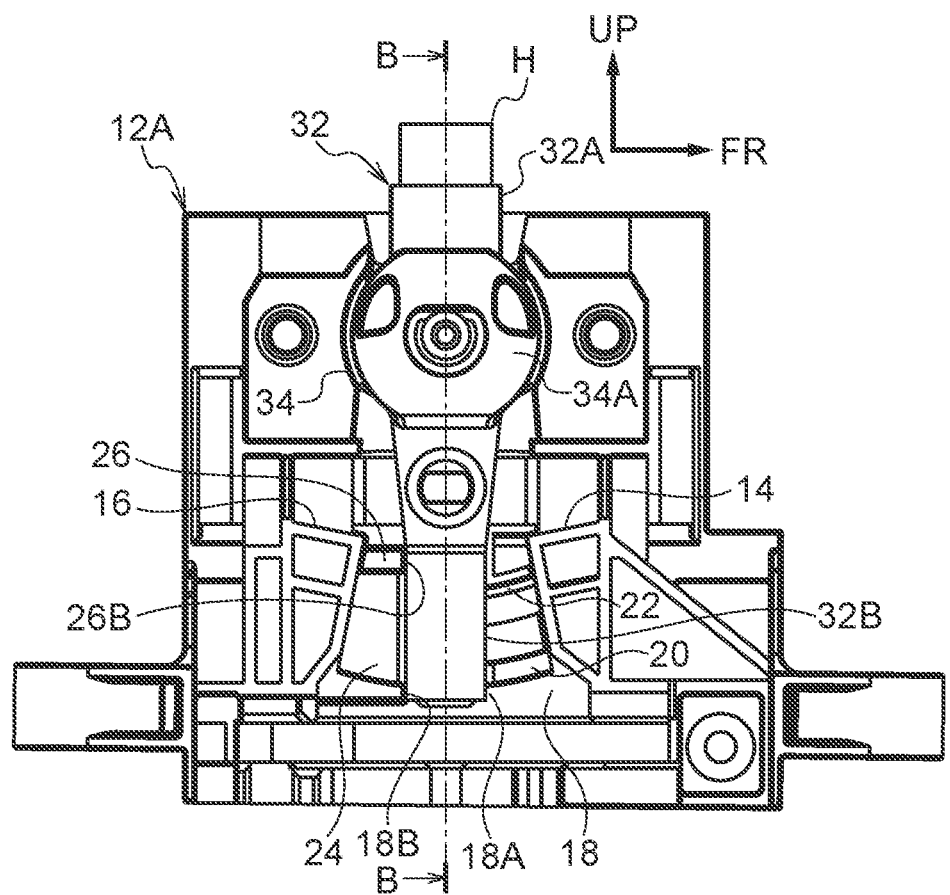
FIG. 5A is a right-hand view illustrating a state in which a lever of a shift lever device according to the first exemplary embodiment of the present invention is disposed at an H position, as viewed from a right side.
Figure 5B:
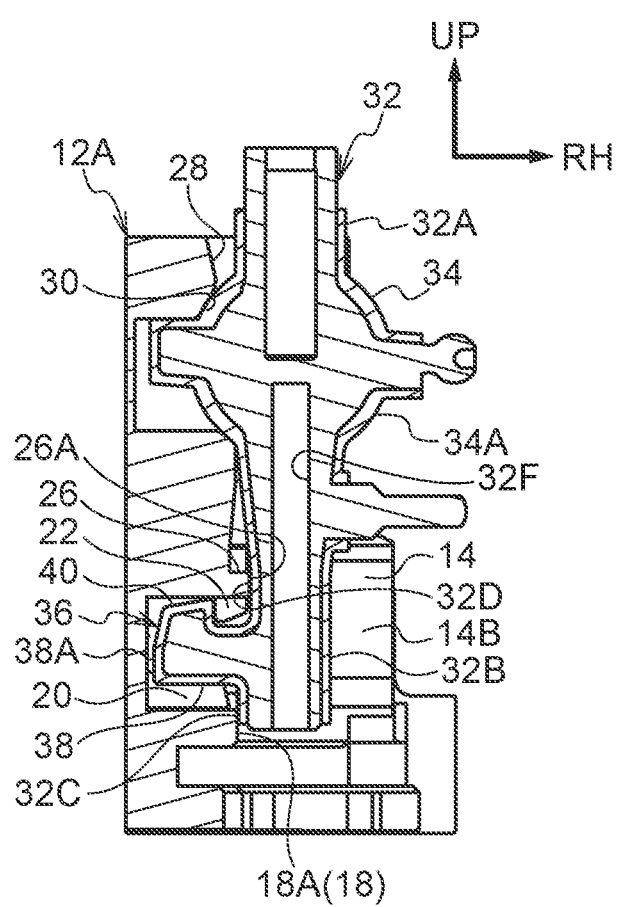
FIG. 5B is a cross-section (sectioned along line B-B in FIG. 5A) illustrating a state in which a lever of a shift lever device according to the first exemplary embodiment of the present invention is disposed at the H position, as viewed from the rear side.

A circular column shaped insertion hole 32F (see FIG. 5B) is coaxially formed in the lower side portion of the lever 32. The insertion hole 32F is open toward the lower side of the lever 32. A substantially circular column shaped detent pin 46 (see FIG. 3), serving as a biasing member configuring a detent unit, is coaxially fitted into the insertion hole 32F. The detent pin 46 projects downward, and a lower face of the detent pin 46 curves in a convex shape. A compression coil spring 46A (see FIG. 3), serving as a biasing means configuring the detent unit, is inserted between an upper face (bottom face) of the insertion hole 32F and an upper face of the detent pin 46. The compression coil spring 46A is disposed at the upper side of the detent pin 46 so as to bias the detent pin 46 toward the lower side.

A substantially rectangular block shaped detent slope 48 (see FIG. 3), serving as an abutting member configuring the detent unit, is disposed at the lower side of the lever 32. The detent slope 48 is fixed to a lower wall of the left plate 12A. A detent face 48A, serving as a sloped face, is formed at an upper face of the detent slope 48. A front-rear direction center of a left side portion of the detent face 48A configures a bottom portion (lower end portion), and the detent face 48A slopes downward on progression toward the bottom portion. The lower face of the detent pin 46 abuts the bottom portion of the detent face 48A under the biasing force of the compression coil spring 46A, such that the lever 32 is disposed at the H position as described above. When the lever 32 is pivot-operated from the H position, the lower face of the detent pin 46 ascends along the detent face 48A against the biasing force of the compression coil spring 46A. When application of pivot operation force ends in a state in which the lever 32 is disposed in a pivot position other than the H position, the lower face of the detent pin 46 descends to the bottom portion of the detent face 48A under the biasing force of the compression coil spring 46A, such that the lever 32 returns to the H position.

A sensor mechanism 42, serving as a detection mechanism, is housed inside the housing frame 12C of the right plate 12B. The sensor mechanism 42 detects the shift position of the lever 32 by detecting a pivot position of the lever 32 in the front-rear direction and the left-right direction.

A substantially rectangular box shaped cover 44, serving as a covering member, is assembled to the right side of the housing frame 12C of the right plate 12B. The inside of the cover 44 is open toward the left side, and the cover 44 covers the inside of the housing frame 12C from the right side.

Explanation follows regarding operation of the present exemplary embodiment.

In the shift lever device 10 with the above configuration, the lever 32 is capable of pivoting about the ball shaft 34, and the sensor mechanism 42 detects the shift position of the lever 32.

As illustrated in FIG. 5A, FIG. 5B, FIG. 10A, and FIG. 10B, when the lever 32 is disposed at the H position, a lower end portion of the lower circumferential face 32B of the lever 32 faces the front restricting face 18A and the central restricting face 18B of the lower end restricting portion 18 of the left plate 12A, and an upper end portion of the lower circumferential face 32B faces the left restricting face 26A and the rear restricting face 26B of the upper end restricting portion 26. Moreover, the hook 36 lies between the lower end restricting portion 18 and the upper end restricting portion 26 such that a lower face of the hook 36 is positioned further upward than the upper face of the lower restricting portion 20. Pivoting of the lower circumferential face 32B of the lever 32 toward the rear side is restricted by the central restricting face 18B of the lower end restricting portion 18, thereby restricting pivot operation of the lever 32 toward the front side. Furthermore, pivoting of a left face of the projecting plate 32C of the lever 32 toward the left side is restricted by the front restricting face 18A of the lower end restricting portion 18, thereby restricting pivot operation of the lever 32 toward the right side. Moreover, pivoting of the rear circumferential face 32E of the lever 32 toward the rear side is restricted by the rear restricting face 26B of the upper end restricting portion 26, thereby restricting pivot operation of the lever 32 toward the front side. Furthermore, pivoting of the left circumferential face 32D of the lever 32 toward the left side is restricted by the left restricting face 26A of the upper end restricting portion 26, thereby restricting pivot operation of the lever 32 toward the right side.

As illustrated in FIG. 5A, FIG. 5B, FIG. 6A, and FIG. 6B, when the lever 32 is pivoted in the front-rear direction between the H position and the M position, a left face of the projecting plate 32C of the lever 32 slides along the front-rear direction against the front restricting face 18A of the lower end restricting portion 18, and the right face of the hook portion 40 of the hook 36 of the lever 32 slides in the front-rear direction against the left face of the upper restricting portion 22 of the left plate 12A. The left circumferential face 32D of the lever 32 also slides in the front-rear direction against the left restricting face 26A of the upper end restricting portion 26.

Figure 6A:
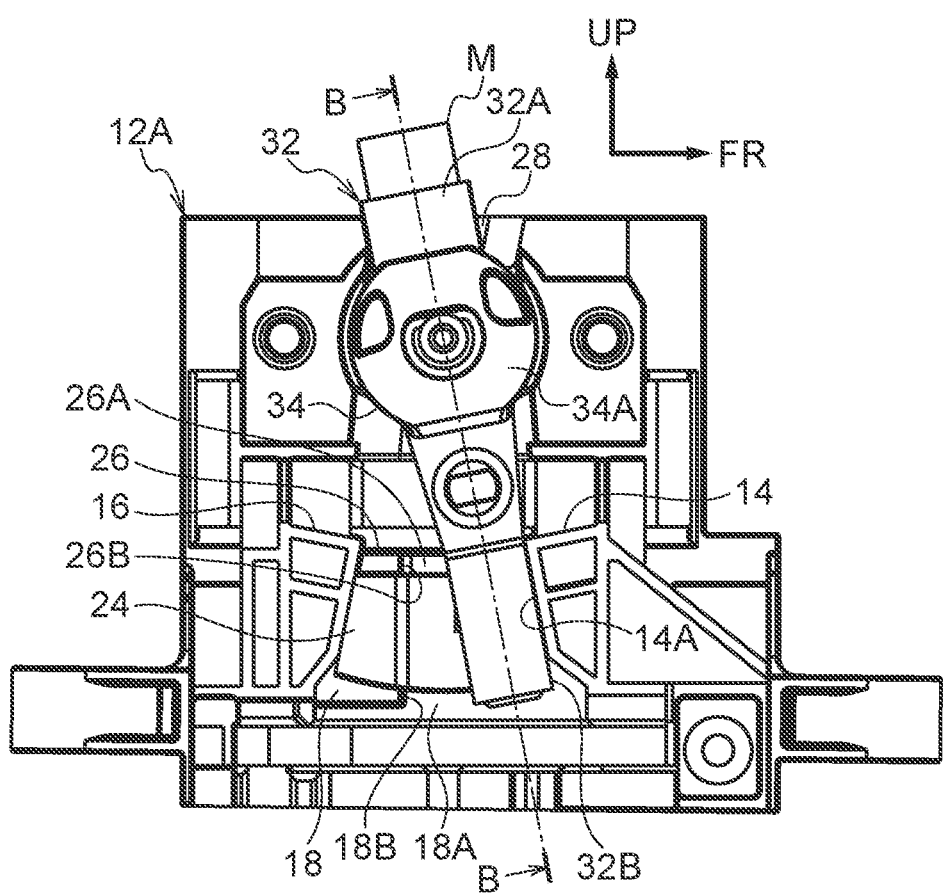
FIG. 6A is a right-hand view illustrating a state in which a lever of a shift lever device according to the first exemplary embodiment of the present invention is disposed at an M position, as viewed from the right side.
Figure 6B:
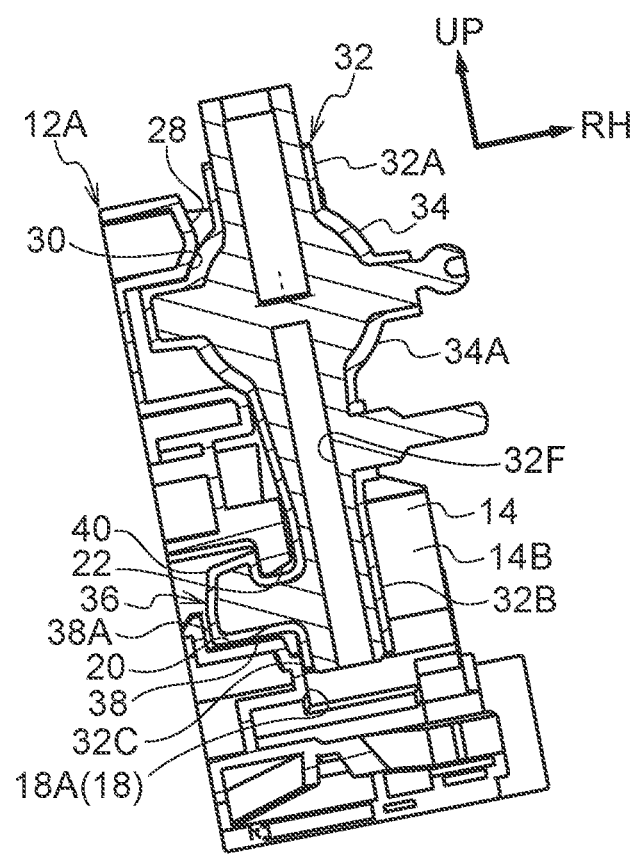
FIG. 6B is a cross-section (sectioned along line B-B in FIG. 6A) illustrating a state in which a lever of a shift lever device according to the first exemplary embodiment of the present invention is disposed at the M position, as viewed from the rear side.
Figure 7A:
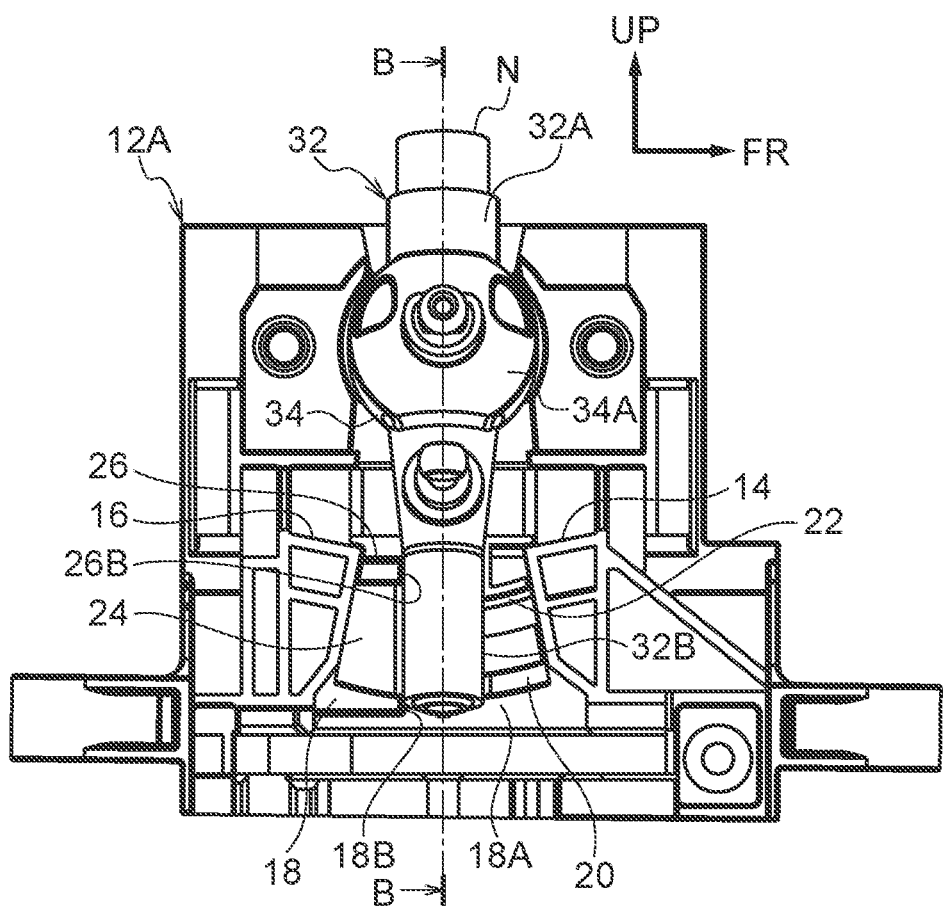
FIG. 7A is a right-hand view illustrating a state in which a lever of a shift lever device according to the first exemplary embodiment of the present invention is disposed at an N position, as viewed from the right side.
Figure 7B:
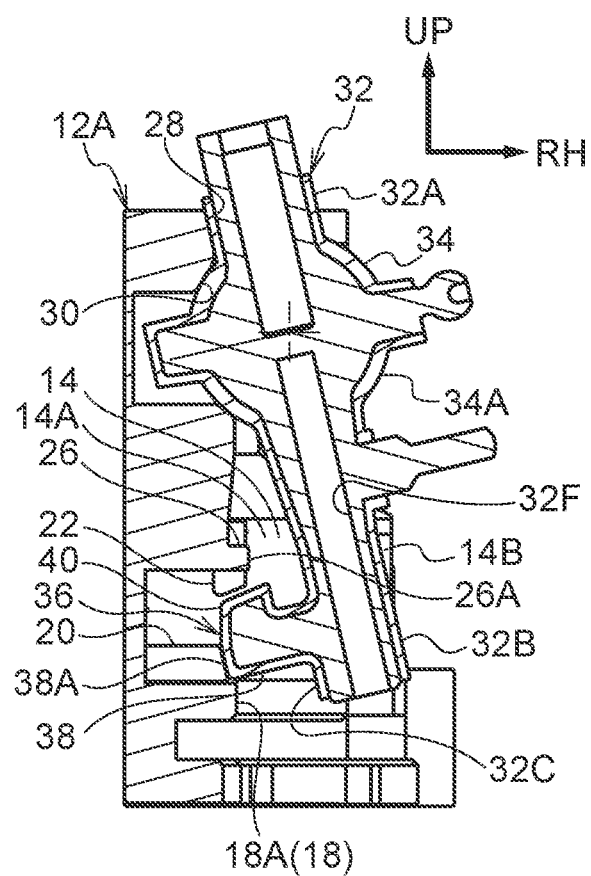
FIG. 7B is a cross-section (sectioned along line B-B in FIG. 7A) illustrating a state in which a lever of a shift lever device according to the first exemplary embodiment of the present invention is disposed at the N position, as viewed from the rear side.

As illustrated in FIG. 6A and FIG. 6B, in order to dispose the lever 32 at the M position, the lever 32 is tilted rearward from the H position. Pivoting of the lower circumferential face 32B of the lever 32 toward the front side is restricted by the first front restricting face 14A of the front end restricting portion 14 of the left plate 12A (the lower circumferential face 32B makes line contact with the first front restricting face 14A), thereby restricting pivot operation of the lever 32 toward the rear side. Furthermore, pivoting of the left face of the projecting plate 32C of the lever 32 toward the left side is restricted by the front restricting face 18A of the lower end restricting portion 18, thereby restricting pivot operation of the lever 32 toward the right side. Moreover, the lower face of the hook 36 is positioned on the upper face of the lower restricting portion 20 when the hook portion 40 of the hook 36 is between the left face of the upper restricting portion 22 and the left wall of the left plate 12A. Pivoting of the right face of the hook portion 40 toward the right side is restricted by the left face of the upper restricting portion 22 (the right face of the hook portion 40 makes face-to-face contact with the left face of the upper restricting portion 22), thereby restricting pivot operation of the lever 32 toward the left side. Furthermore, if an excessive load is input to the lever 32, the lower face of the hook 36 (projecting portion 38), serves as a back-up that impinges on the upper face of the lower restricting portion 20, such that the lever 32 is prevented from coming out of the plate 12.

As illustrated in FIG. 5A, FIG. 5B, FIG. 7A, FIG. 7B, and FIG. 10A to FIG. 13B, when the lever 32 is pivoted in the left-right direction between the H position and the N position, the lever 32 is gradually tilted toward the left from the H position. A front face of the projecting portion 38 and a front face of the hook portion 40 of the hook 36 respectively slide in the left-right direction against the rear face of the lower restricting portion 20 and the rear face of the upper restricting portion 22 of the left plate 12A, and the lower circumferential face 32B of the lever 32 slides in the left-right direction against the central restricting face 18B of the lower end restricting portion 18. The rear circumferential face 32E of the lever 32 slides in the left-right direction against the rear restricting face 26B of the upper end restricting portion 26 of the left plate 12A.

As illustrated in FIG. 7A, FIG. 7B, FIG. 13A, and FIG. 13B, in order to dispose the lever 32 at the N position, the lever 32 is tilted toward the left from the H position. Pivoting of the upper circumferential face 32A of the lever 32 toward the left side is restricted by the upper restricting face 28 of the left plate 12A, thereby restricting pivot operation of the lever 32 toward the left side. The lower end portion of the lower circumferential face 32B of the lever 32 is positioned further toward the lower side than the lower end restricting portion 18 of the left plate 12A, and positioned further toward the right than the front restricting face 18A and the central restricting face 18B. The upper end portion of the lower circumferential face 32B is positioned further toward the right than the left restricting face 26A and the rear restricting face 26B of the upper end restricting portion 26. Moreover, the lower face of the hook 36 is positioned further downward than the upper face of the lower end restricting portion 18 and the upper face of the lower restricting portion 20.

As illustrated in FIG. 7A, FIG. 7B, FIG. 8A, and FIG. 8B, when the lever 32 is pivoted in the front-rear direction between the N position and the R position, the upper circumferential face 32A of the lever 32 slides in the front-rear direction against the upper restricting face 28 of the left plate 12A, and the leading end face 38A of the projecting portion 38 of the hook 36 slides in the front-rear direction against the right face of the rear restricting portion 24 of the left plate 12A.

Figure 8A:
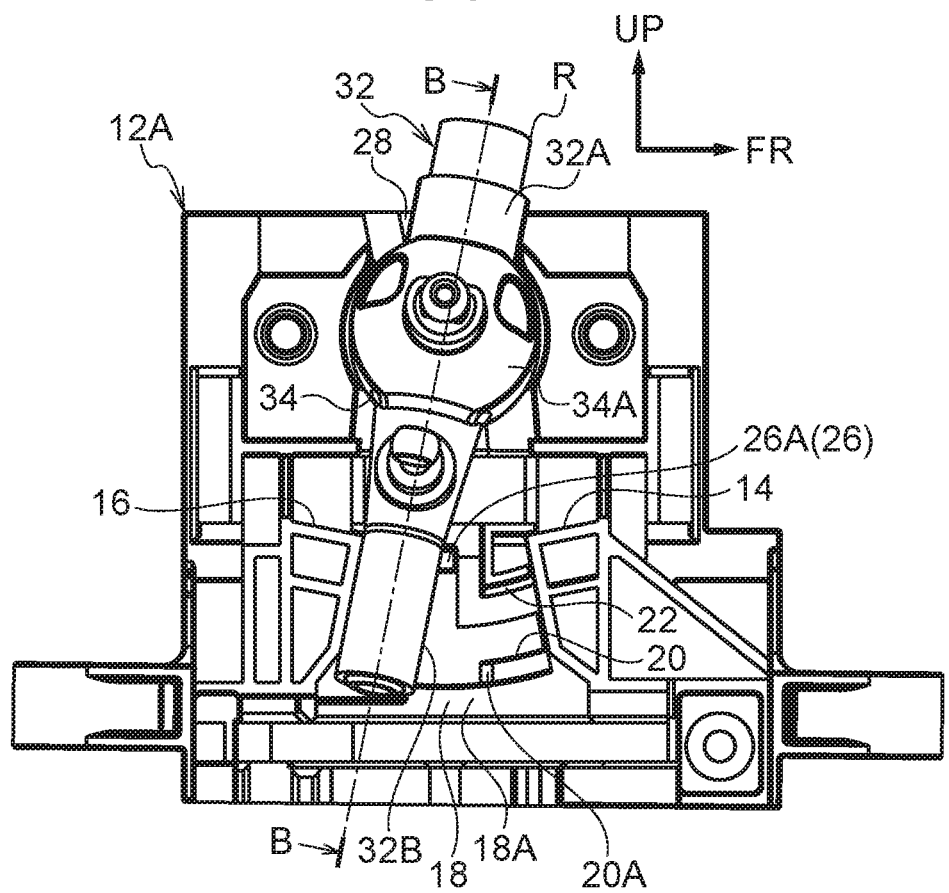
FIG. 8A is a right-hand view illustrating a state in which a lever of a shift lever device according to the first exemplary embodiment of the present invention is disposed at an R position, as viewed from the right side.
Figure 8B:
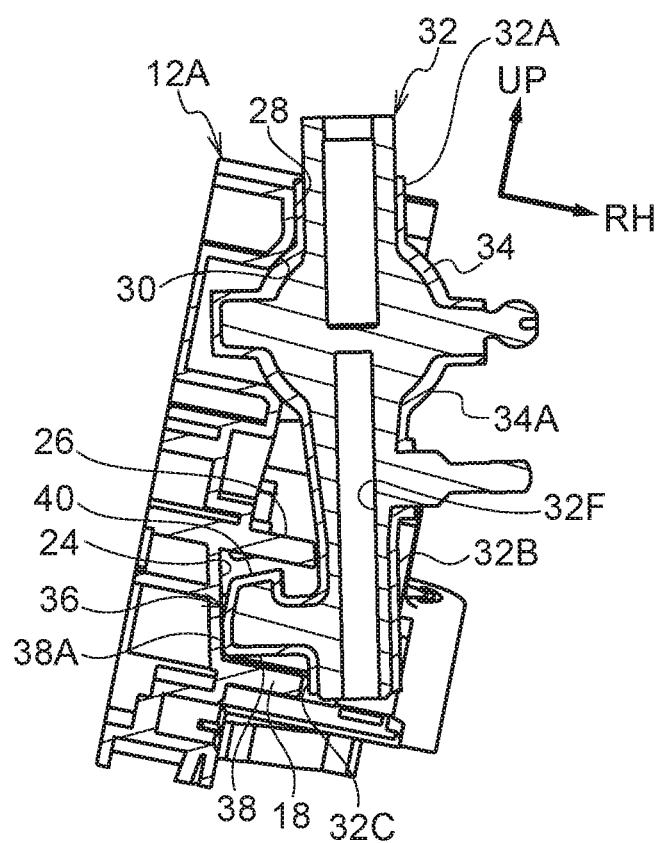
FIG. 8B is a cross-section (sectioned along line B-B in FIG. 8A) illustrating a state in which a lever of a shift lever device according to the first exemplary embodiment of the present invention is disposed at the R position, as viewed from the rear side.

As illustrated in FIG. 8A and FIG. 8B, in order to dispose the lever 32 at the R position, the lever 32 is tilted toward the front from the N position. The lower circumferential face 32B of the lever 32 faces the front face of the rear end restricting portion 16 further toward the right side than the lower end restricting portion 18 of the left plate 12A and further rearward than the central restricting face 18B. The leading end face 38A of the projecting portion 38 of the hook 36 faces the right face of the rear restricting portion 24. Pivoting of the lower circumferential face 32B of the lever 32 toward the rear side is restricted by the front face of the rear end restricting portion 16 (the lower circumferential face 32B makes line contact with the front face of the rear end restricting portion 16), thereby restricting pivot operation of the lever 32 toward the front side. Furthermore, pivoting of the upper circumferential face 32A of the lever 32 toward the left side is restricted by the upper restricting face 28 of the left plate 12A, thereby restricting pivot operation of the lever 32 toward the left side. Moreover, pivoting of the leading end face 38A of the projecting portion 38 of the hook 36 toward the left side is restricted by the right face of the rear restricting portion 24 (the leading end face 38A makes face-to-face contact with the right face of the rear restricting portion 24), thereby restricting pivot operation of the lever 32 toward the right side.

Figure 9A:
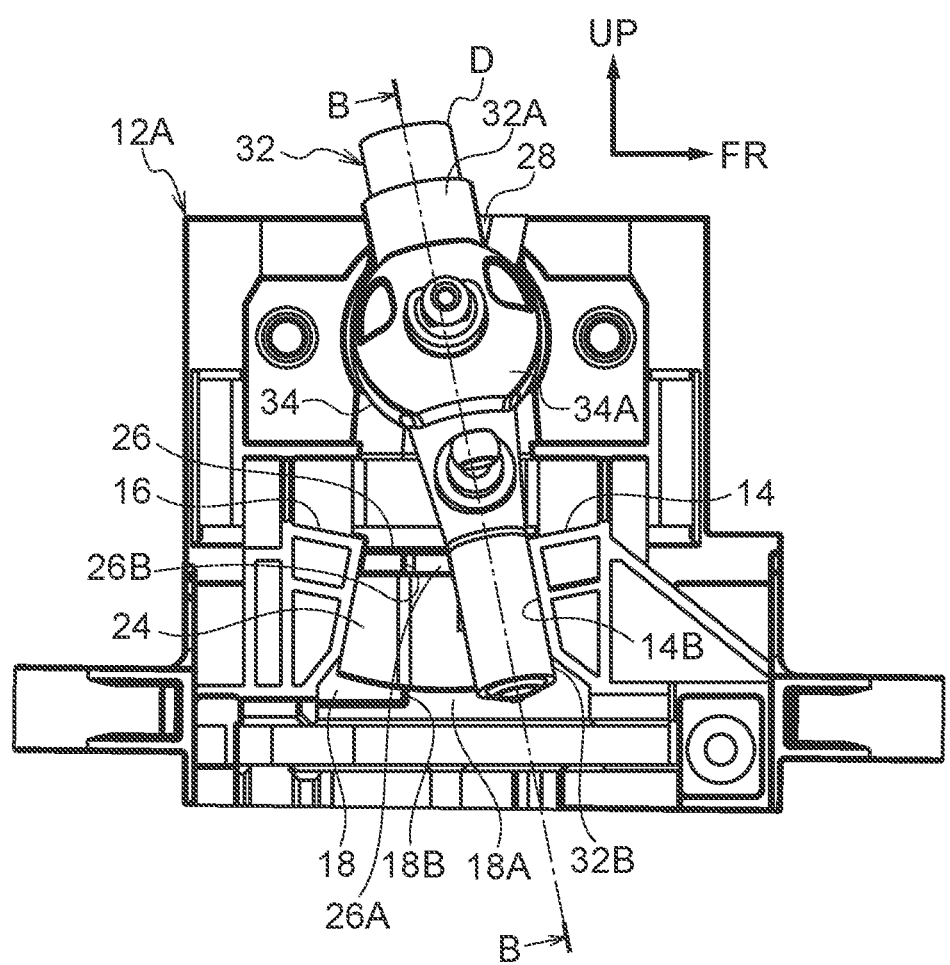
FIG. 9A is a right-hand view illustrating a state in which a lever of a shift lever device according to the first exemplary embodiment of the present invention is disposed at a D position, as viewed from the right side.
Figure 9B:
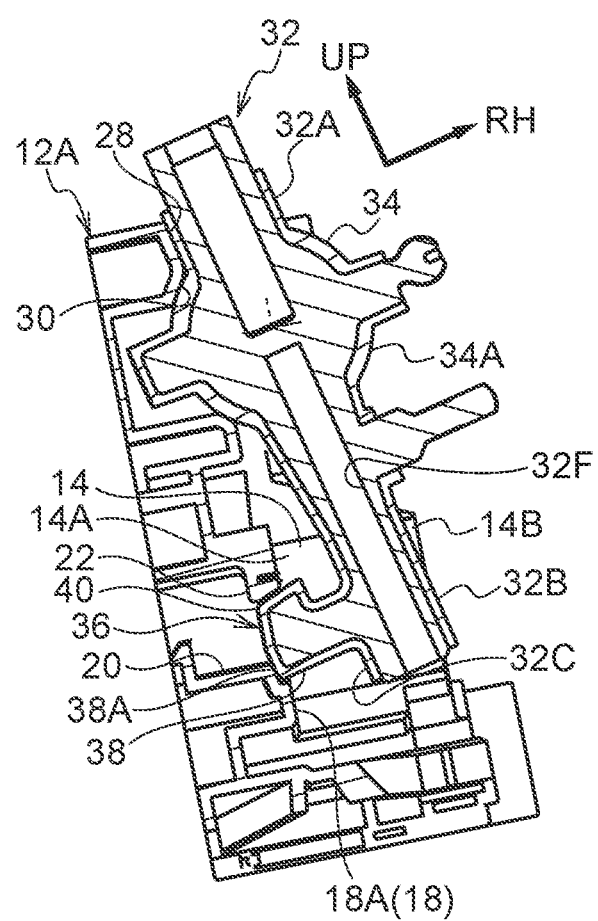
FIG. 9B is a cross-section (sectioned along line B-B in FIG. 9A) illustrating a state in which a lever of a shift lever device according to the first exemplary embodiment of the present invention is disposed at the D position, as viewed from the rear side.
Figure 10A:
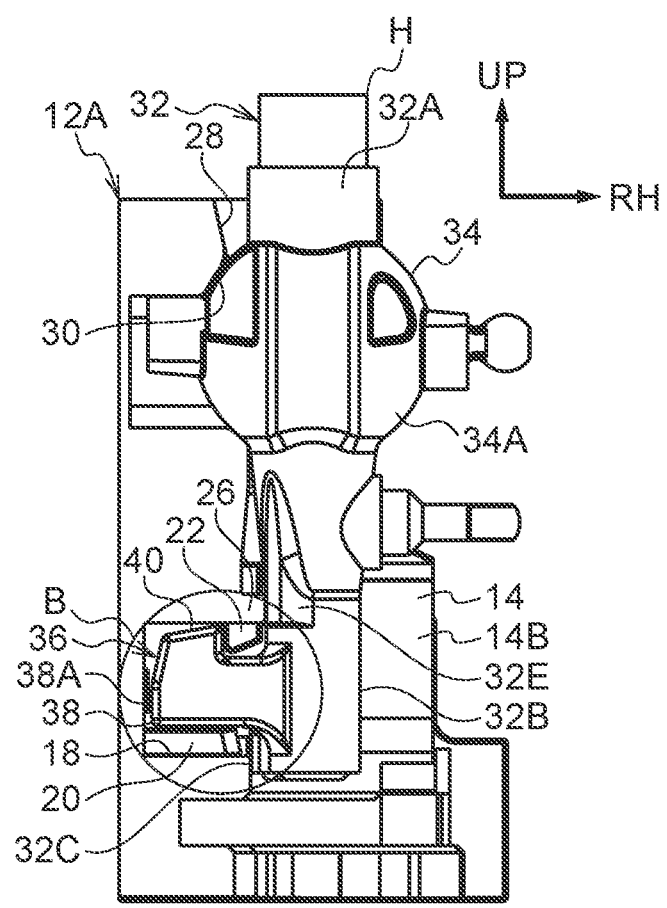
FIG. 10A is a rear view illustrating a state in which a lever of a shift lever device according to the first exemplary embodiment of the present invention is disposed at the H position, as viewed from the rear side.
Figure 10B:
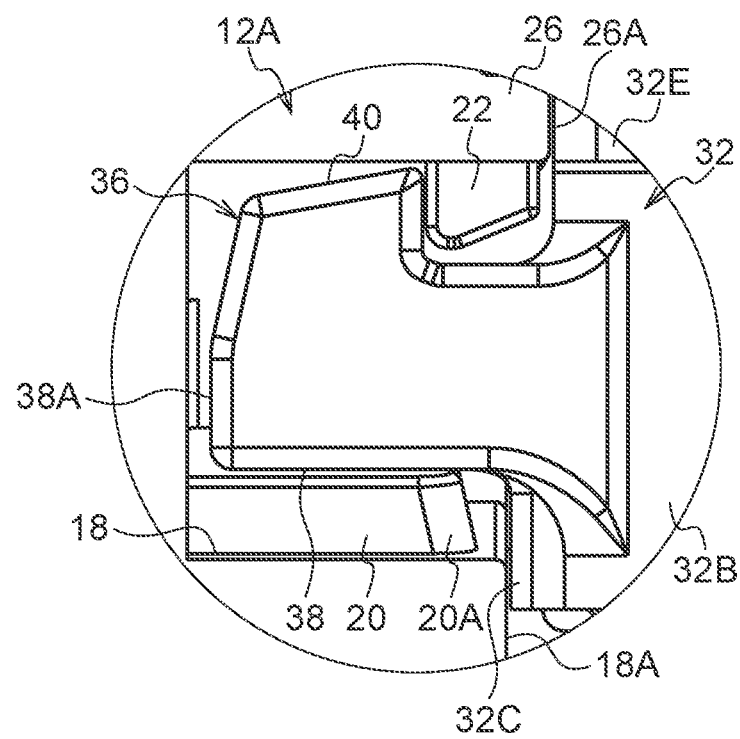
FIG. 10B is an enlarged view of area B in FIG. 10A.

As illustrated in FIG. 7, FIG. 9A, and FIG. 9B, when the lever 32 is pivoted in the front-rear direction between the N position and the D position, the upper circumferential face 32A of the lever 32 slides in the front-rear direction against the upper restricting face 28 of the left plate 12A, and the leading end face 38A of the projecting portion 38 of the hook 36 slides in the front-rear direction against the right face of the lower restricting portion 20 of the left plate 12A.

As illustrated in FIG. 9A, and FIG. 9B, in order to dispose the lever 32 at the D position, the lever 32 is tilted toward the rear from to the N position. The lower circumferential face 32B of the lever 32 faces the second front restricting face 14B of the front end restricting portion 14 further toward the right side than the lower end restricting portion 18 of the left plate 12A, and further toward the front than the central restricting face 18B. The leading end face 38A of the projecting portion 38 of the hook 36 faces the right face of the lower restricting portion 20. Pivoting of the lower circumferential face 32B of the lever 32 toward the front side is restricted by the second front restricting face 14B of the front end restricting portion 14 (the lower circumferential face 32B makes line contact with the second front restricting face 14B), thereby restricting pivot operation of the lever 32 toward the rear side. Furthermore, pivoting of the upper circumferential face 32A of the lever 32 toward the left side is restricted by the upper restricting face 28 of the left plate 12A, thereby restricting pivot operation of the lever 32 toward the left side. Moreover, pivoting of the leading end face 38A of the projecting portion 38 of the hook 36 toward the left side is restricted by the right face of the lower restricting portion 20 (the leading end face 38A makes face-to-face contact with the right face of the lower restricting portion 20), thereby restricting pivot operation of the lever 32 toward the right side.

Note that the respective portions of the lever 32 (including the hook 36 and the projecting plate 32C) slide against the respective portions of the left plate 12A in cases in which load is input to the lever 32 when pivoting the lever 32 as described above. If load is not input to the lever 32 when pivoting the lever 32, the respective portions of the lever 32 do not abut the respective portions of the left plate 12A. Even in cases in which load is input to the lever 32 when the lever 32 is pivoted, portions other than these respective portions of the lever 32 and portions other than these respective portions of the left plate 12A do not abut each other.

Note that the projecting portion 38 of the hook 36 of the lever 32 projects toward the left from the lever 32. Furthermore, as described above, when the lever 32 is being disposed on the R position side from the N position, or on the D position side from the N position, pivoting of the leading end face 38A of the projecting portion 38 toward the left side is restricted by both the right face of the rear restricting portion 24 and the right face of the lower restricting portion 20 of the left plate 12A, thereby restricting pivot operation of the lever 32 toward the right side.

Thus, unlike in cases in which pivoting of the left face of the hook portion 40 of the hook 36 toward the left side is restricted by the left plate 12A so as to restrict pivot operation of the lever 32 toward the right side, flexing of the hook 36 (deformation in which the hook portion 40 pivots in the left-right direction with respect to the projecting portion 38 and the projecting portion 38 pivots in the up-down direction with respect to the lever 32) can be suppressed, enabling rattling of the lever 32 in the left-right direction to be suppressed. Moreover, tensile stress can be suppressed from acting on a lower end (base end) of the hook portion 40, enabling the strength with which pivot operation of the lever 32 toward the right side is restricted to be increased.

Furthermore, the projecting portion 38 of the hook 36 projects from the lever 32 toward the left (a side in a direction perpendicular to the length direction of the lever 32), the leading end face 38A of the projecting portion 38 faces toward the left, and is disposed vertically so as to run along the length direction of the lever 32. Thus, when pivot operation of the lever 32 toward the right side is restricted while the lever 32 is positioned further toward the R position side than the N position or further toward the D position side than the N position, compression stress can be made to effectively act on the projecting portion 38, enabling flexing of the hook 36 to be effectively suppressed, and thereby enabling rattling of the lever 32 in the left-right direction to be effectively suppressed.

Moreover, as described above, when the lever 32 is being disposed at the M position, the R position, or the D position, pivoting of the lower circumferential face 32B of the lever 32 in the front-rear direction is respectively restricted by the first front restricting face 14A of the front end restricting portion 14, the front face of the rear end restricting portion 16, and the second front restricting face 14B of the front end restricting portion 14 of the left plate 12A, thereby restricting pivot operation of the lever 32 in the front-rear direction. Thus, unlike in cases in which pivoting of the hook 36 in the front-rear direction is restricted by the left plate 12A so as to restrict pivot operation of the lever 32 in the front-rear direction, tensile stress can be suppressed from acting on the base end of the hook 36 (the right end of the projecting portion 38), thereby enabling the strength with which pivot operation of the lever 32 in the front-rear direction is restricted to be increased.

Moreover, the upper side portion of the left face of the projecting portion 38 and the left face of the hook portion 40 of the hook 36 are in the same plane as each other, and each slope toward the right on progression upward. Thus, as described above, when the lever 32 is disposed further toward the M position side than the H position and pivoting of the right face of the hook portion 40 toward the right side is restricted by the left face of the upper restricting portion 22 of the left plate 12A, flexing of the hook 36 can be suppressed, enabling rattling of the lever 32 in the left-right direction to be suppressed. Moreover, tensile stress acting on the lower end (base end) of the hook portion 40 can be reduced, thereby enabling the strength with which pivot operation of the lever 32 toward the left side is restricted to be increased.

Furthermore, from the projecting portion 38, the hook portion 40 of the hook 36 projects toward the ball shaft 34 side (upper side) of the lever 32. Thus, unlike in cases in which the hook portion 40 projects toward the opposite side to the ball shaft 34 (toward the lower side) of the lever 32 from the projecting portion 38, the hook portion 40 and the upper restricting portion 22 of the left plate 12A can be disposed between the ball shaft 34 and the projecting portion 38, enabling the size of the shift lever device 10 in the up-down direction (a pivot-radial direction and the length direction of the lever 32) to be reduced.

Figure 11A:
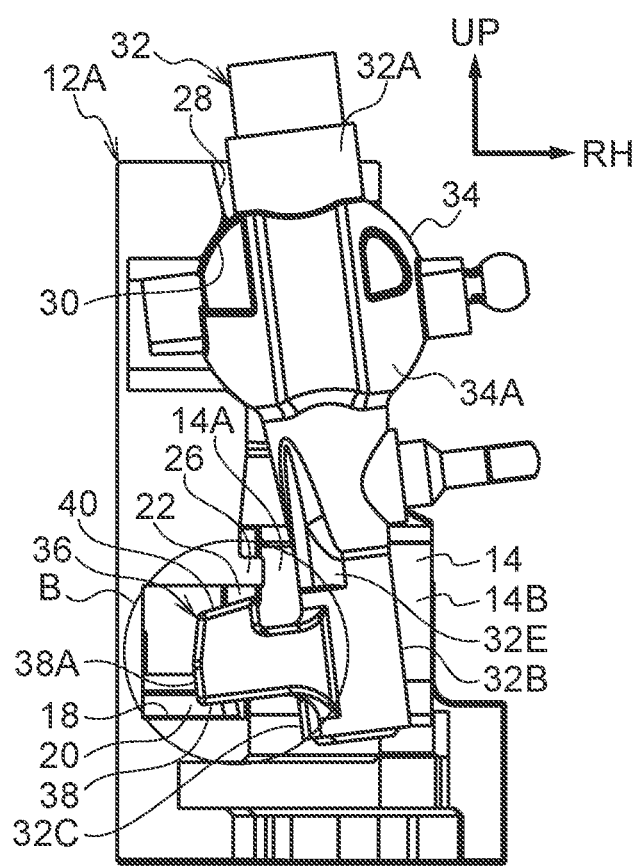
FIG. 11A is a rear view illustrating a first stage during pivoting of a lever of a shift lever device according to the first exemplary embodiment of the present invention from the H position to the N position, as viewed from the rear side.
Figure 11B:
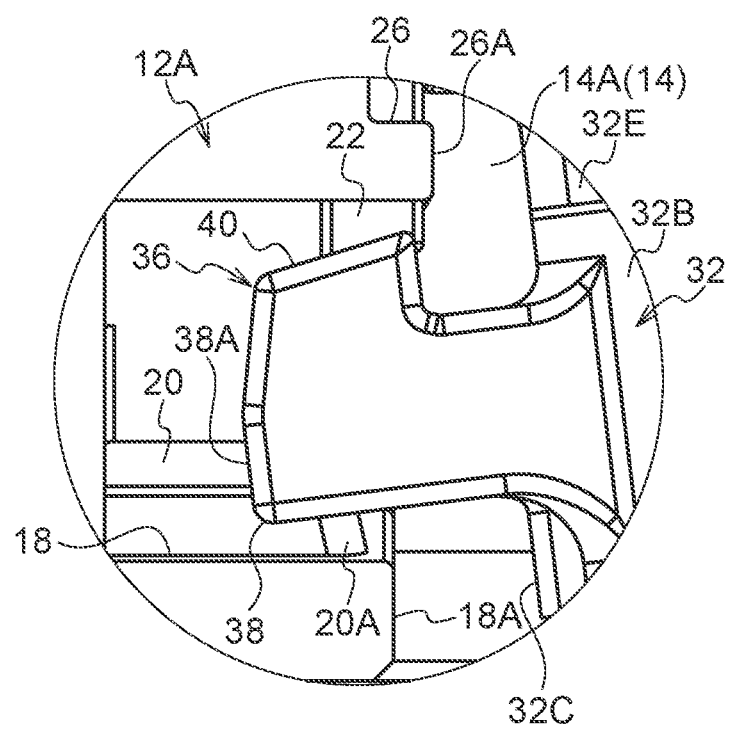
FIG. 11B is an enlarged view of area B in FIG. 11A.

Moreover, as illustrated in FIG. 10A to FIG. 13B, when the lever 32 is pivot-operated toward the left side from the H position to the N position, pivoting of the front face of the projecting portion 38 and the front face of the hook portion 40 toward the front side is restricted by both the rear face of the lower restricting portion 20 and the rear face of the upper restricting portion 22 of the left plate 12A, thereby restricting pivot operation of the lever 32 toward the rear side (see FIG. 11A and FIG. 11B). This enables pivot operation of the lever 32 toward the rear side to be effectively restricted.

Figure 12A:
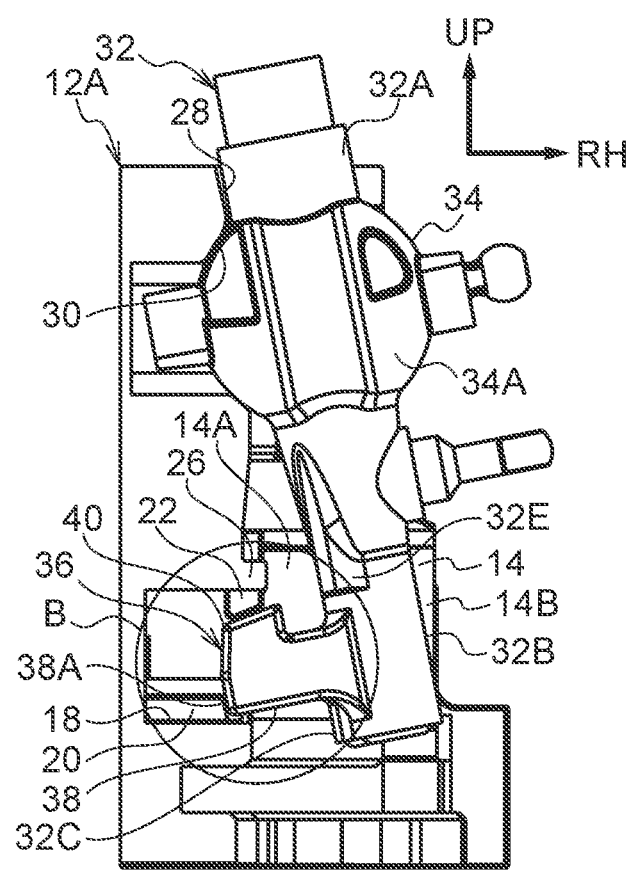
FIG. 12A is a rear view illustrating a second stage during pivoting of a lever of a shift lever device according to the first exemplary embodiment of the present invention from the H position to the N position, as viewed from the rear side.
Figure 12B:
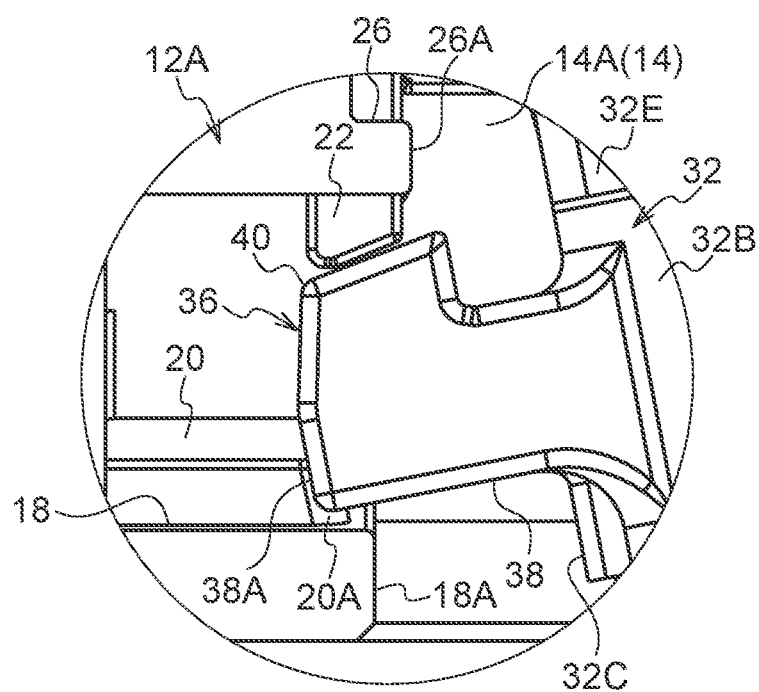
FIG. 12B is an enlarged view of area B in FIG. 12A.
Figure 13A:
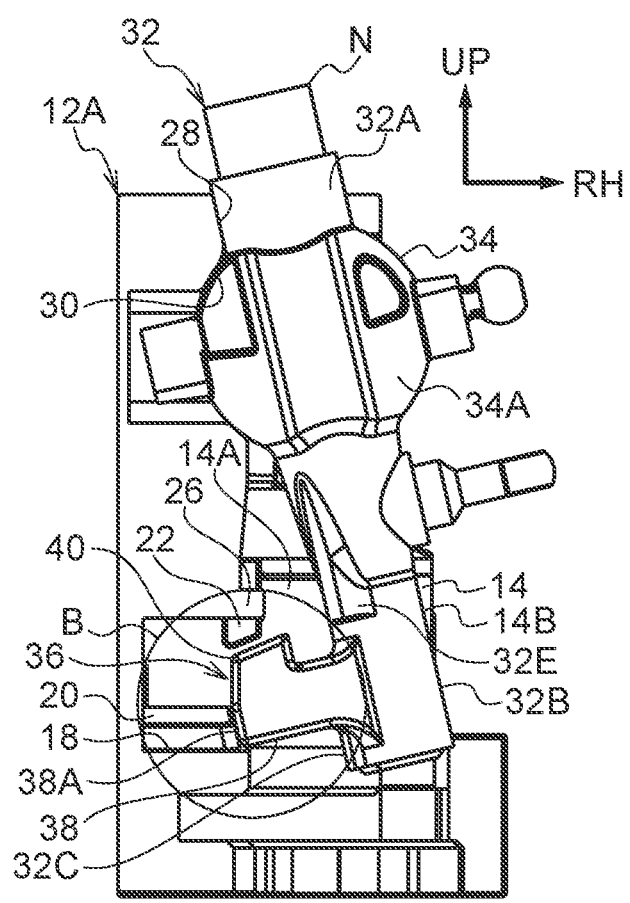
FIG. 13A is a rear view illustrating a state in which a lever of a shift lever device according to the first exemplary embodiment of the present invention is disposed at the N position, as viewed from the rear side.
Figure 13B:
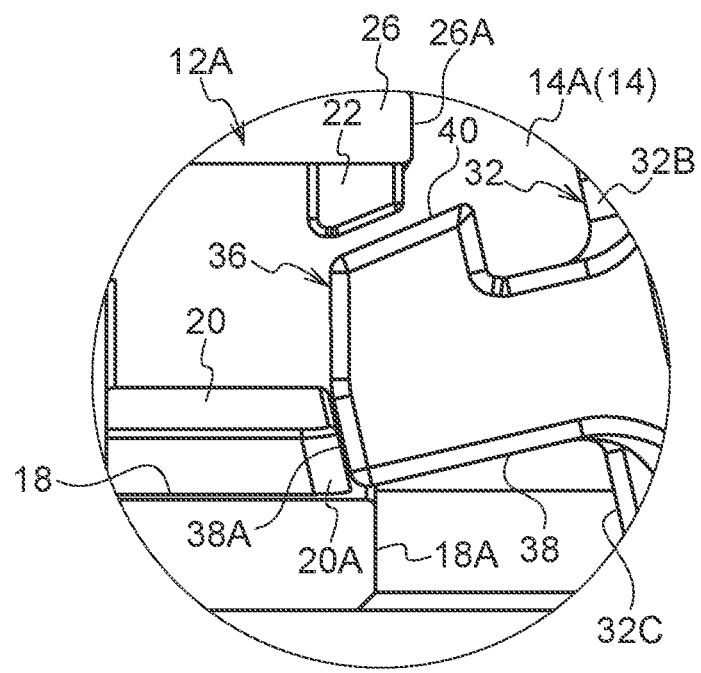
FIG. 13B is an enlarged view of area B in FIG. 13A.

Pivoting of the front face of the projecting portion 38 toward the front side is then restricted by the rear face of the lower restricting portion 20 of the left plate 12A only, and this restricts pivot operation of the lever 32 toward the rear side (see FIG. 12A and FIG. 12B). This enables the force restricting pivot operation of the lever 32 toward the rear side directly before the lever 32 is pivot-operated to the N position to be reduced. Moreover, when the lever 32 is passed from the H position side to the D position side via the N position (when pivot operation direction of the lever 32 changes from toward the left side to toward the rear side), the projecting portion 38 of the hook 36 is guided around the corner portion 20A at the rear-right side of the lower restricting portion 20, so as to change the pivot direction of the hook 36 from toward the right side to toward the front side. Namely, the pivot operation direction of the lever 32 from toward the left side to toward the rear side is guided (see FIG. 12A to FIG. 13B). This enables an improved, smoother pivot operation feel of the lever 32 when the lever 32 is pivot-operated from the H position to the D position via the N position. Moreover, the pivot operation feel of the lever 32 when the lever 32 is pivot-operated from the H position to the R position via the N position is also an improved pivot operation feel, similarly to the pivot operation feel of the lever 32 when the lever 32 is pivot-operated from the H position to the D position via the N position.

Moreover, the plate 12 restricts pivot operations of the lever 32 at the left plate 12A that is on projection direction side of the projecting portion 38 of the lever 32, and the sensor mechanism 42 is provided at the right plate 12B (the opposite side to the projection direction of the projecting portion 38) of the plate 12. Thus, the load restricting pivot operation of the lever 32 is suppressed from acting on the right plate 12B, thereby enabling the detection accuracy of the shift position of the lever 32 by the sensor mechanism 42 to be improved.

Second Exemplary Embodiment

Figure 14A:
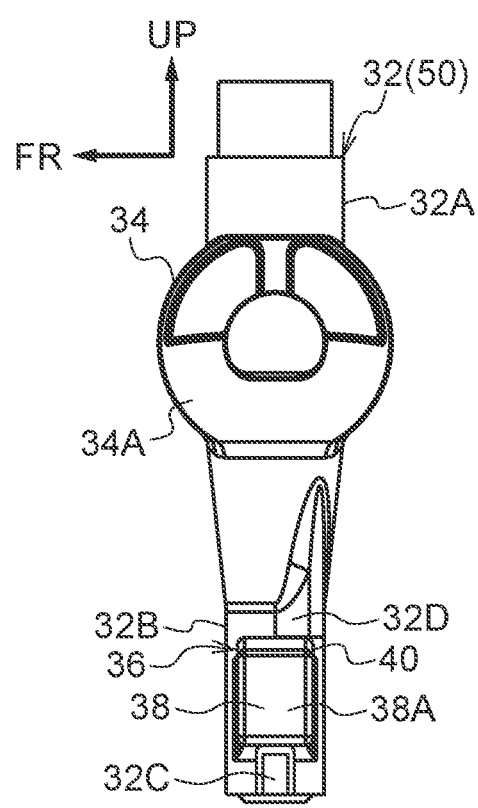
FIG. 14A is a left-hand view illustrating a lever of a shift lever device according to a second exemplary embodiment of the present invention, as viewed from a left side.
Figure 14B:
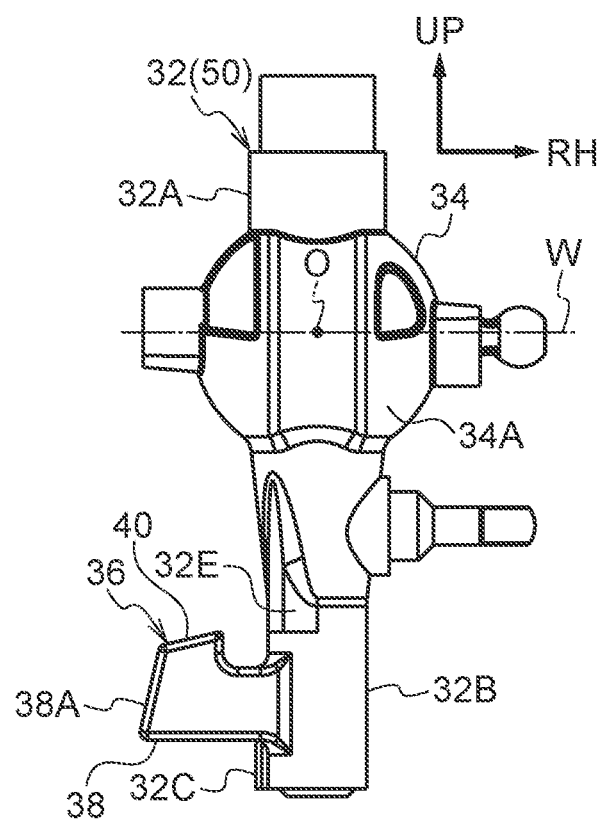
FIG. 14B is a rear view illustrating a lever of a shift lever device according to the second exemplary embodiment of the present invention, as viewed from a rear side.

FIG. 14A is a left-hand view illustrating the lever 32 of a shift lever device 50, serving as a shift device according to a second exemplary embodiment of the present invention, as viewed from the left. FIG. 14B is a rear view illustrating the lever 32 of the shift lever device 50 as viewed from the rear.

The shift lever device 50 according the present exemplary embodiment has substantially the same configuration as the first exemplary embodiment, but differs in the following points.

As illustrated in FIG. 14A and FIG. 14B, in the shift lever device 50 according to the present exemplary embodiment, the entire left face of the projecting portion 38 of the hook 36 of the lever 32 slopes toward the right on progression upward, and the left face of the projecting portion 38 and the left face of the hook portion 40 are in the same plane as each other. Moreover, the right face of the lower restricting portion 20 and the right face of the rear restricting portion 24 of the left plate 12A are planar faces that are perpendicular to the left-right direction so as to correspond to the left face of the projecting portion 38 and the left face of the hook portion 40.

Note that the present exemplary embodiment is capable of exhibiting similar operation and advantageous effects to those of the first exemplary embodiment.

In particular, the entire left face of the projecting portion 38 and the left face of the hook portion 40 of the hook 36 are in the same plane as each other and slope toward the right on progression upward. Thus, when the lever 32 is disposed further toward the M position side than the H position and pivoting of the right face of the hook portion 40 toward the right side is restricted by the left face of the upper restricting portion 22 of the left plate 12A, flexing of the hook 36 can be effectively suppressed, enabling rattling of the lever 32 in the left-right direction to be effectively suppressed. Moreover, tensile stress acting on the lower end (base end) of the hook portion 40 can be effectively reduced, enabling the strength with which pivot operation of the lever 32 toward the left side is restricted to be effectively increased.

Third Exemplary Embodiment

Figure 15A:
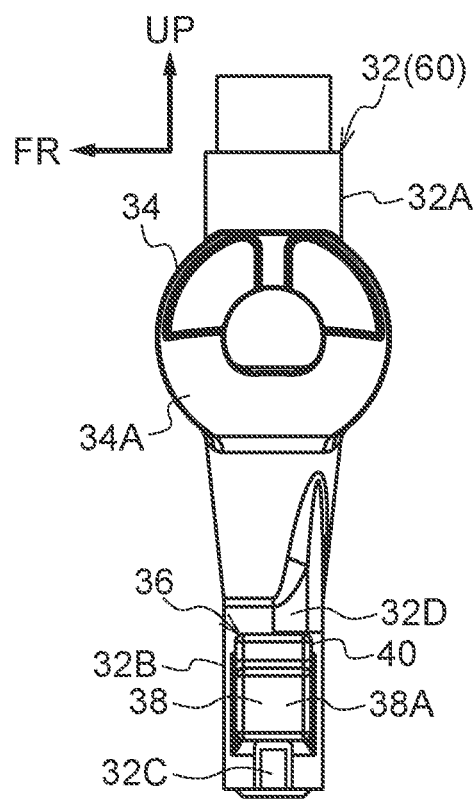
FIG. 15A is a left-hand view illustrating a lever of a shift lever device according to a third exemplary embodiment of the present invention, as viewed from a left side.
Figure 15B:
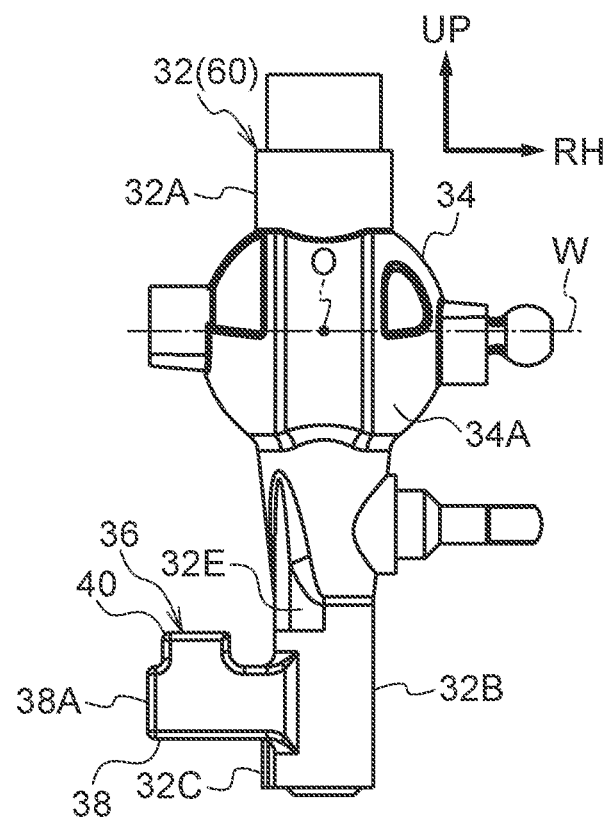
FIG. 15B is a rear view illustrating a lever of a shift lever device according to the third exemplary embodiment of the present invention, as viewed from a rear side.

FIG. 15A is a left-hand view illustrating the lever 32 of a shift lever device 60, serving as a shift device according to a third exemplary embodiment of the present invention, as viewed from the left. FIG. 15B is a rear view illustrating the lever 32 of the shift lever device 60 as viewed from the rear.

The shift lever device 60 according the present exemplary embodiment has substantially the same configuration as the first exemplary embodiment, but differs in the following points.

As illustrated in FIG. 15A and FIG. 15B, in the shift lever device 60 according to the present exemplary embodiment, the entire left face of the projecting portion 38 of the hook 36 of the lever 32 is a planar face that is perpendicular to the left-right direction, and the upper face of the hook portion 40 is a planar face that is perpendicular to the up-down direction. The left face of the hook portion 40 is a planar face that is perpendicular to the left-right direction, and the left face of the hook portion 40 is disposed further toward the right side than the left face of the projecting portion 38.

Note that the present exemplary embodiment is capable of exhibiting similar operation and advantageous effects to those of the first exemplary embodiment.

In particular, the left face of the hook portion 40 of the hook 36 is disposed further toward the right side than the left face of the projecting portion 38. Thus, when the lever 32 is disposed further toward the M position side than the H position and pivoting of the right face of the hook portion 40 toward the right side is restricted by the left face of the upper restricting portion 22 of the left plate 12A, flexing of the hook 36 can be effectively suppressed, enabling rattling of the lever 32 in the left-right direction to be effectively suppressed. Moreover, tensile stress acting on the lower end (base end) of the hook portion 40 can be effectively reduced, enabling the strength with which pivot operation of the lever 32 toward the left side is restricted to be effectively increased.

Note that in the first exemplary embodiment to the third exemplary embodiment, the leading end face 38A of the projecting portion 38 of the hook 36 of the lever 32 is a planar face that is perpendicular to the left-right direction. However, the leading end face 38A (slide face) of the projecting portion 38 may be curved in a convex shape in the front-rear direction. Thus, when the leading end face 38A of the projecting portion 38 slides in the front-rear direction against the right face of the rear restricting portion 24 and the right face of the lower restricting portion 20 of the left plate 12A, the leading end face 38A of the projecting portion 38 makes line contact with both the right face of the rear restricting portion 24 and the right face of the lower restricting portion 20, thereby enabling resistance of the hook 36 to pivoting to be reduced, and thus enabling rotation force about the axis of the lever 32 to be suppressed from acting on the lever 32.

Furthermore, in the first exemplary embodiment to the third exemplary embodiment, the right face of the hook portion 40 of the hook 36 of the lever 32 is a planar face that is perpendicular to the left-right direction. However, the right face (slide face) of the hook portion 40 of the hook 36 of the lever 32 may be curved in a convex shape in the front-rear direction. Thus, when the right face of the hook portion 40 slides in the front-rear direction against the left face of the upper restricting portion 22 of the left plate 12A, the right face of the hook portion 40 makes line contact with the left face of the upper restricting portion 22, thereby enabling resistance of the hook 36 to pivoting to be reduced, and thus enabling rotation force about the axis of the lever 32 to be suppressed from acting on the lever 32.

Moreover, in the first exemplary embodiment to the third exemplary embodiment, the axis of rotation of the lever 32 is configured by the ball shaft 34. However, for example, the axis of rotation of the lever 32 may be configured by a pair of columnar shafts that intersect each other.

Furthermore, in the first exemplary embodiment to the third exemplary embodiment, the hook 36 is provided further toward the lower side than the axis of rotation (ball shaft 34) of the lever 32. However, the hook 36 may be provided further toward the upper side than the axis of rotation of the lever 32.

Moreover, in the first exemplary embodiment to the third exemplary embodiment, the left plate 12A and the right plate 12B of the plate 12 are configured by separate bodies. However, the left plate 12A and the right plate 12B of the plate 12 may be configured in an integral unit.

Furthermore, in the first exemplary embodiment to the third exemplary embodiment, the shift lever device 10, 50, 60 is a floor-mounted device that is installed to the floor section of the vehicle cabin. However, the shift lever device 10, 50, 60 may be installed to an instrument panel or a steering column in the vehicle cabin.

The entire content of the disclosure of Japanese Patent Application No. 2017-48412 is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A shift device comprising:
   a shift body moved from a home position in a first direction and in a second direction intersecting the first direction so as to change a shift position, the first direction being forward or rearward of the shift body and the second direction being a left-right direction of the shift body, and the shift body extending in an extension direction intersecting the first direction and the second direction;
   a first projecting portion projecting from the shift body toward a first side in the second direction;
   a second projecting portion projecting from the first projecting portion toward a first side in the extension direction of the shift body; and
   a restricting body restricting movement of a projection leading end face of the first projecting portion such that operation of the shift body toward a second side in the second direction is restricted, and the restricting body restricting movement of the second projecting portion such that movement of the shift body is restricted.

2. The shift device of claim 1, wherein:
   the first projecting portion projects in a substantially perpendicular direction to a length direction of the shift body; and
   the projection leading end face of the first projecting portion is disposed along the length direction of the shift body.

3. The shift device of claim 1, wherein the restricting body restricts movement of the shift body such that movement of the shift body in the first direction is restricted.

4. The shift device of claim 1, further comprising:
   a slide face provided at at least one of the first projecting portion or the second projecting portion, the slide face sliding in the first direction with respect to the restricting body, and the slide face having a curved shape.

5. The shift device of claim 1, wherein:
   the shift body is capable of pivoting; and
   the second projecting portion projects toward a pivot center side of the shift body.

6. The shift device of claim 1, wherein:
   the restricting body is provided with a pair of restricting faces that restrict movement of the first projecting portion and the second projecting portion, such that movement of the shift body in the first direction is restricted when the shift body is being moved in the second direction from the home position; and
   beginning partway through movement of the shift body in the second direction from the home position, one of the pair of restricting faces restricts movement of only one of the first projecting portion or the second projecting portion such that movement of the shift body in the first direction is restricted.

7. The shift device of claim 1, wherein:
   the restricting body restricts movement of the first projecting portion and the second projecting portion toward a projection direction side of the first projecting portion; and
   a detection mechanism configured to detect a shift position of the shift body is provided on an opposite side of the restricting body from the projection direction side of the first projecting portion.

* * * * *